United States Patent
Morabit et al.

(10) Patent No.: US 6,314,848 B2
(45) Date of Patent: *Nov. 13, 2001

(54) SELF-CONTAINED FLEXIBLE AERODYNAMIC CUTTING ELEMENT WITH MATCHING HEAD

(76) Inventors: Vincent D. Morabit, 1230 Wendy Rd., Rock Hill, SC (US) 29732; Michael Z. Morabito, 1992 Court Ave., Memphis, TN (US) 38104; Christopher J. Morabito, 654 E. Main St., Rock Hill, SC (US) 29730

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,786

(22) Filed: Feb. 3, 1999

Related U.S. Application Data

(60) Provisional application No. 60/103,549, filed on Oct. 8, 1998, and provisional application No. 60/074,899, filed on Feb. 17, 1998.

(51) Int. Cl.⁷ ........................... B26B 27/00
(52) U.S. Cl. ................. 83/13; 30/276; 56/12.7
(58) Field of Search .................. 83/13; 30/276, 30/347; 56/295, 12.7, 255; D8/8; 76/101.1, 115

(56) References Cited

U.S. PATENT DOCUMENTS

| | | |
|---|---|---|
| D. 245,757 | 9/1977 | Fisher et al. ............... D8/391 |
| D. 249,150 | 8/1978 | Scanland et al. ........... D15/17 |
| D. 250,648 | 12/1978 | Scanland et al. ........... D15/17 |
| 4,065,913 | 1/1978 | Fisher et al. ............... 56/295 |
| 4,126,990 | 11/1978 | Fisher et al. ............... 56/295 |
| 4,126,991 | 11/1978 | Gobin et al. ............... 56/295 |
| 4,165,597 | 8/1979 | Scanland et al. ........... 56/295 |
| 4,186,239 * | 1/1980 | Mize et al. . |
| 4,249,311 * | 2/1981 | Inaga . |
| 4,356,686 * | 11/1982 | Lessig, III . |
| 4,825,627 * | 5/1989 | Truderung ............... 56/12.7 |
| 4,987,681 | 1/1991 | Sepke ....................... 30/276 |
| 5,023,998 * | 6/1991 | Masciarella et al. ....... 30/276 |
| 5,048,278 * | 9/1991 | Jones et al. ........... 30/276 X |
| 5,170,561 | 12/1992 | Sepke ....................... 30/276 |
| 5,303,476 * | 4/1994 | Tuggle ................. 30/276 X |
| 5,433,006 * | 7/1995 | Taguchi ................... 30/276 |
| 5,463,815 * | 11/1995 | Fogle ....................... 30/276 |
| 5,473,873 * | 12/1995 | Sheldon .................... 56/255 |
| 5,687,482 * | 11/1997 | Behrendt ................... 30/276 |
| 5,711,141 * | 1/1998 | Pitman et al. ............. 56/255 |
| 5,761,816 * | 6/1998 | Morabit et al. ......... 30/347 X |
| 5,836,227 * | 11/1998 | Dees, Jr. et al. .......... 30/276 |
| 5,996,233 * | 12/1999 | Morabit . |
| 6,094,823 * | 8/2000 | Brown et al. . |

FOREIGN PATENT DOCUMENTS

| | | |
|---|---|---|
| 0 011 175 | 11/1978 | (EP) . |
| WO 97/19584 | 6/1997 | (WO) . |

* cited by examiner

*Primary Examiner*—Kenneth E. Peterson
(74) *Attorney, Agent, or Firm*—Nixon & Vanderhye P.C.

(57) ABSTRACT

A vegetation cutter, a cutting string for use with a vegetation cutter, and a method of cutting vegetation, are provided which utilize a novel cutting string arrangement in which a twist and living hinge are provided in a cutting string having a drag co-efficient of less than 1.0, typically with a first long axis and a second short axis, the second axis less than 85% of the first axis. The twist is provided between the free end of the string and where the string is mounted to the head, or where two twists are provided in the string, the string is mounted to the head at a central portion between the twists. The string may be mounted to the head by grooves or slots and/or clamping mechanisms, or a wide variety of other components. The cutting string may have a wide variety of cross-sectional configurations (both symmetrical, such as elliptical, or non-symmetrical, such as substantially tear drop). The twist is typically between about 30–150°, most desirably about 90°.

15 Claims, 26 Drawing Sheets

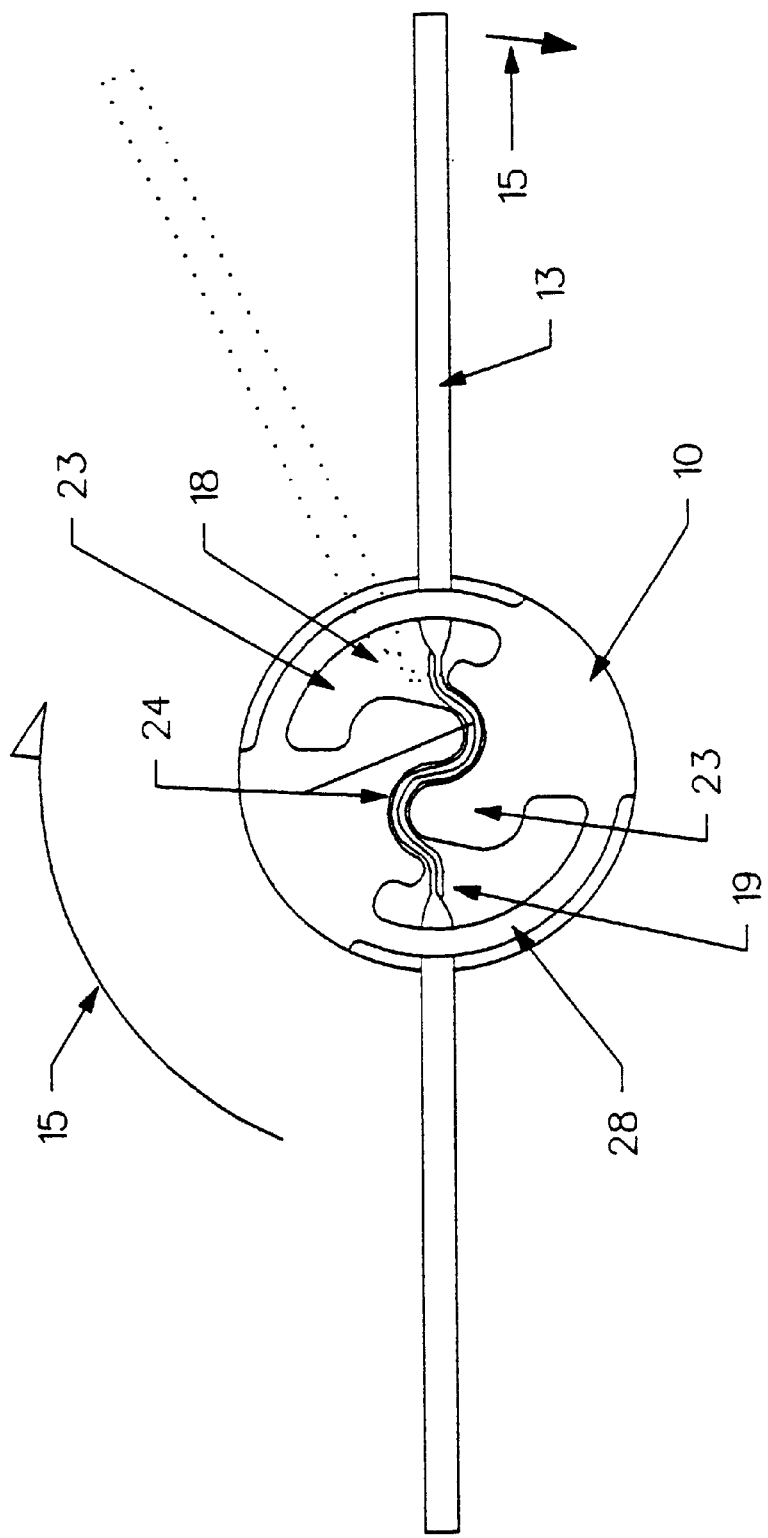

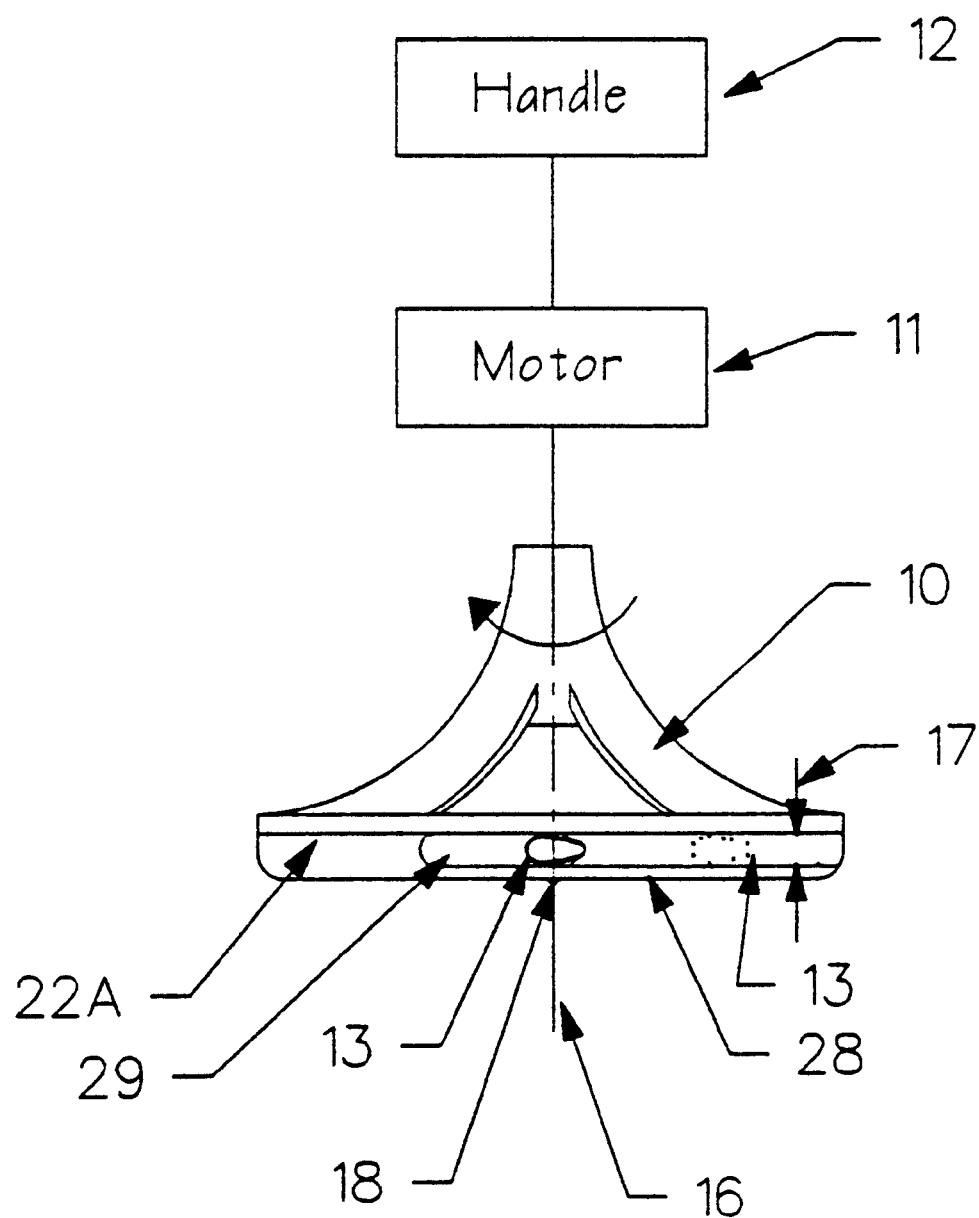

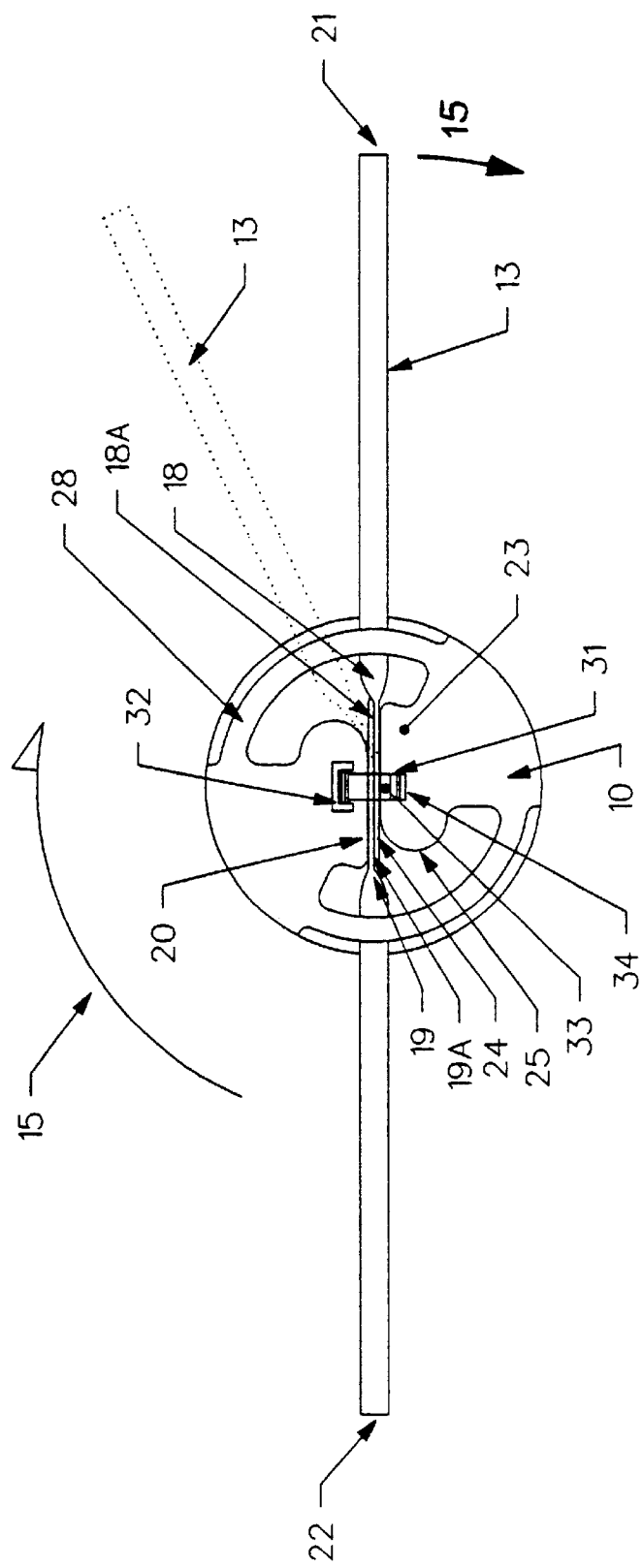

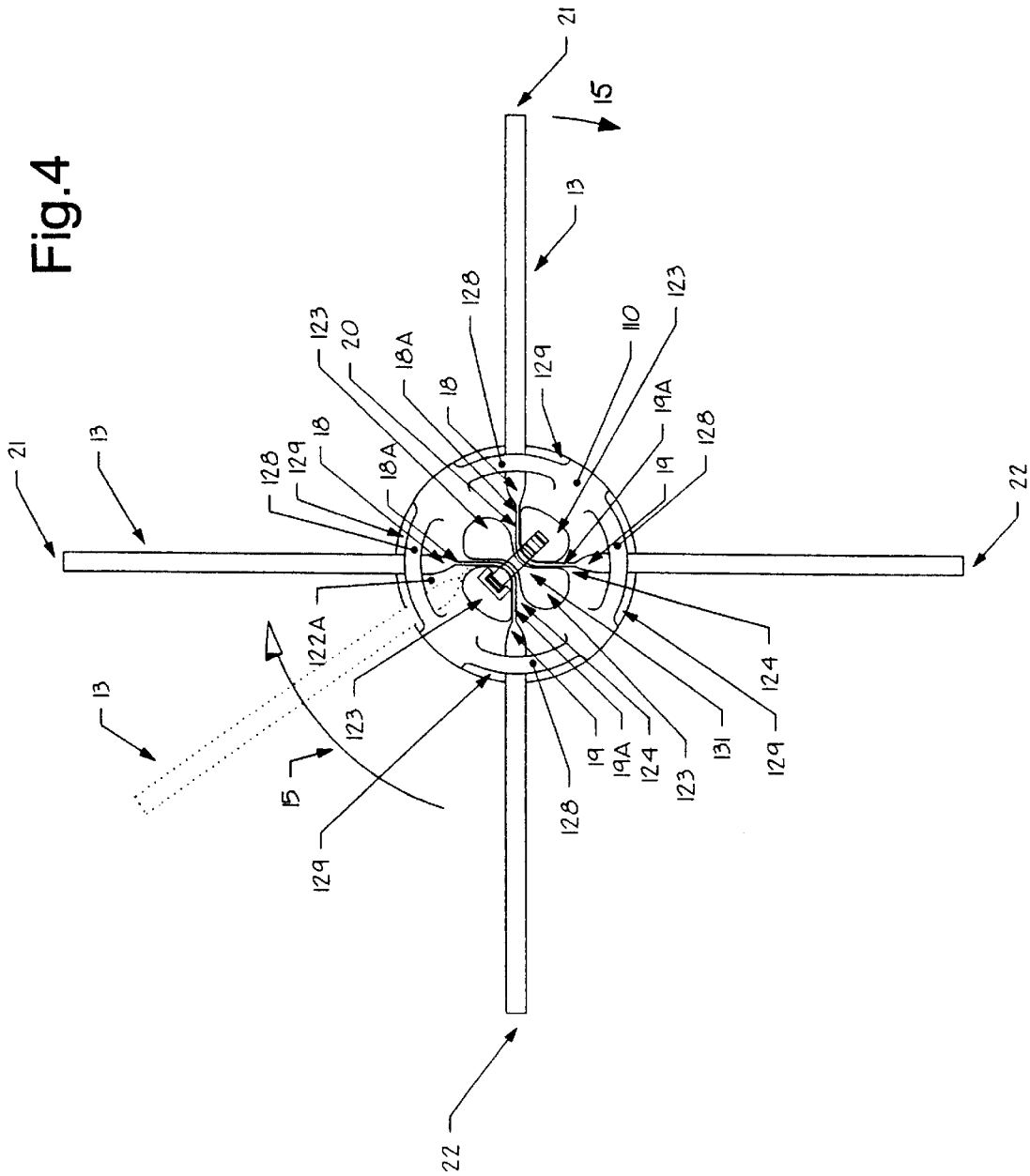

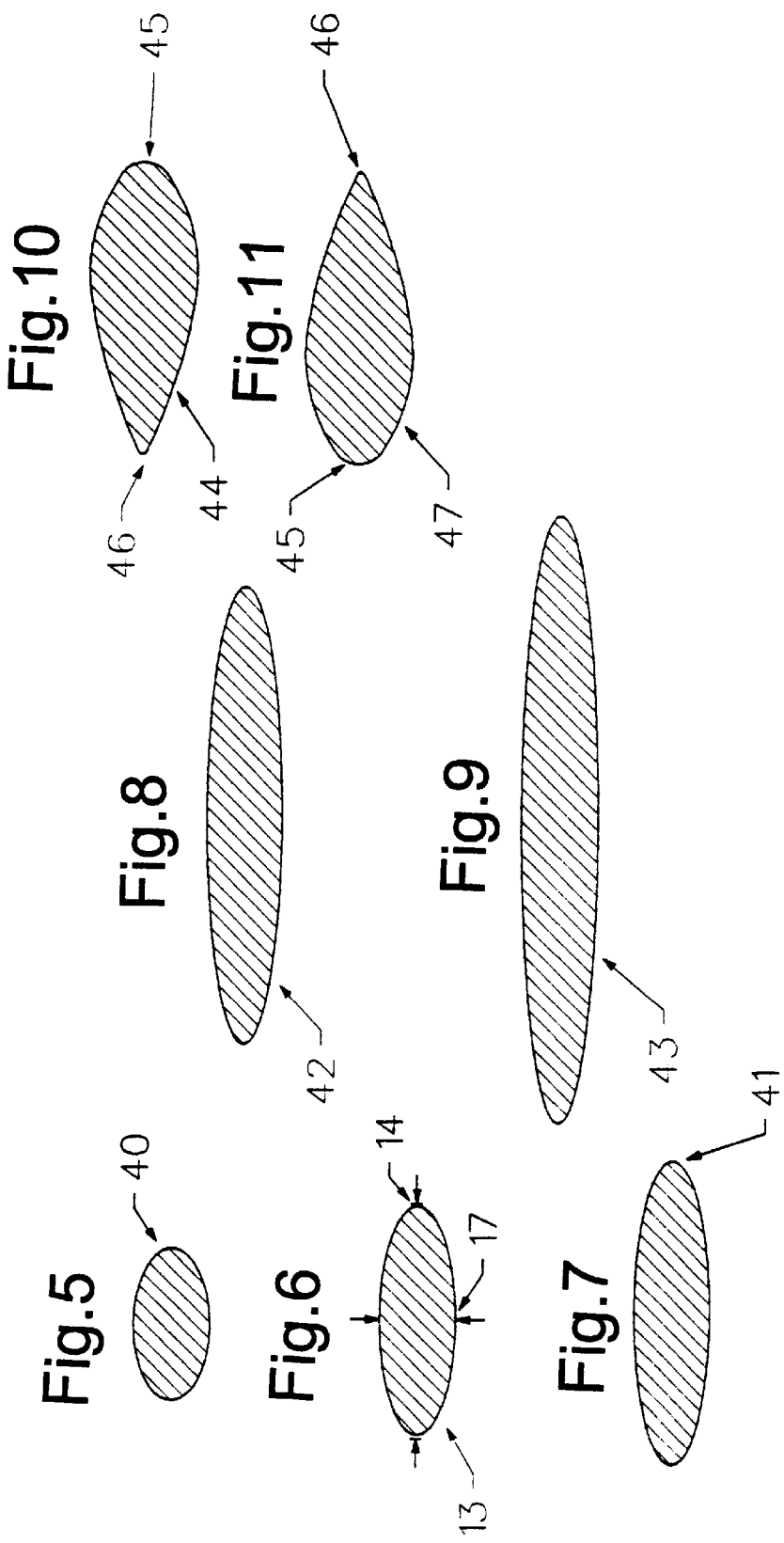

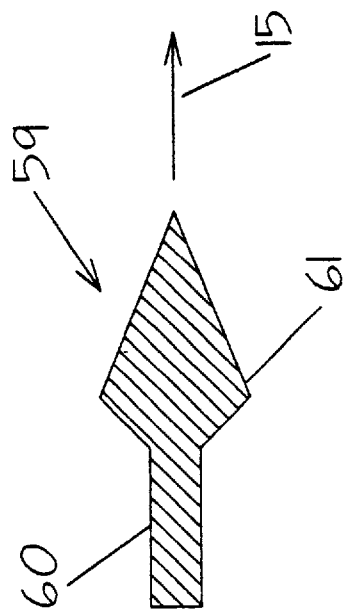
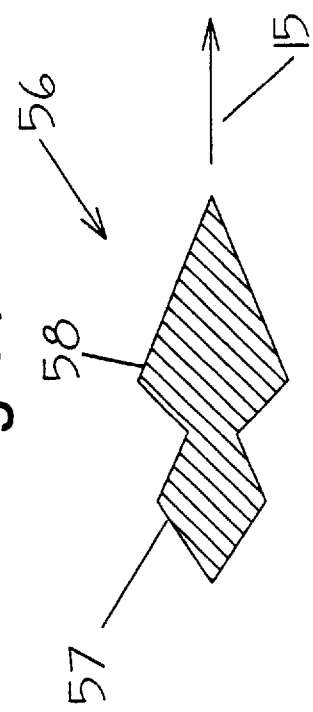
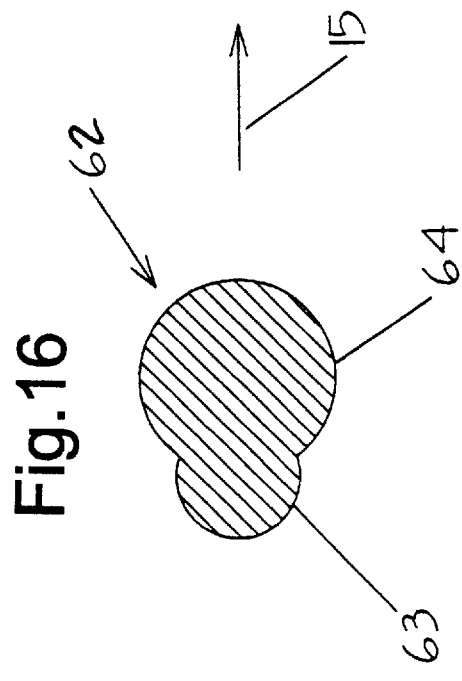

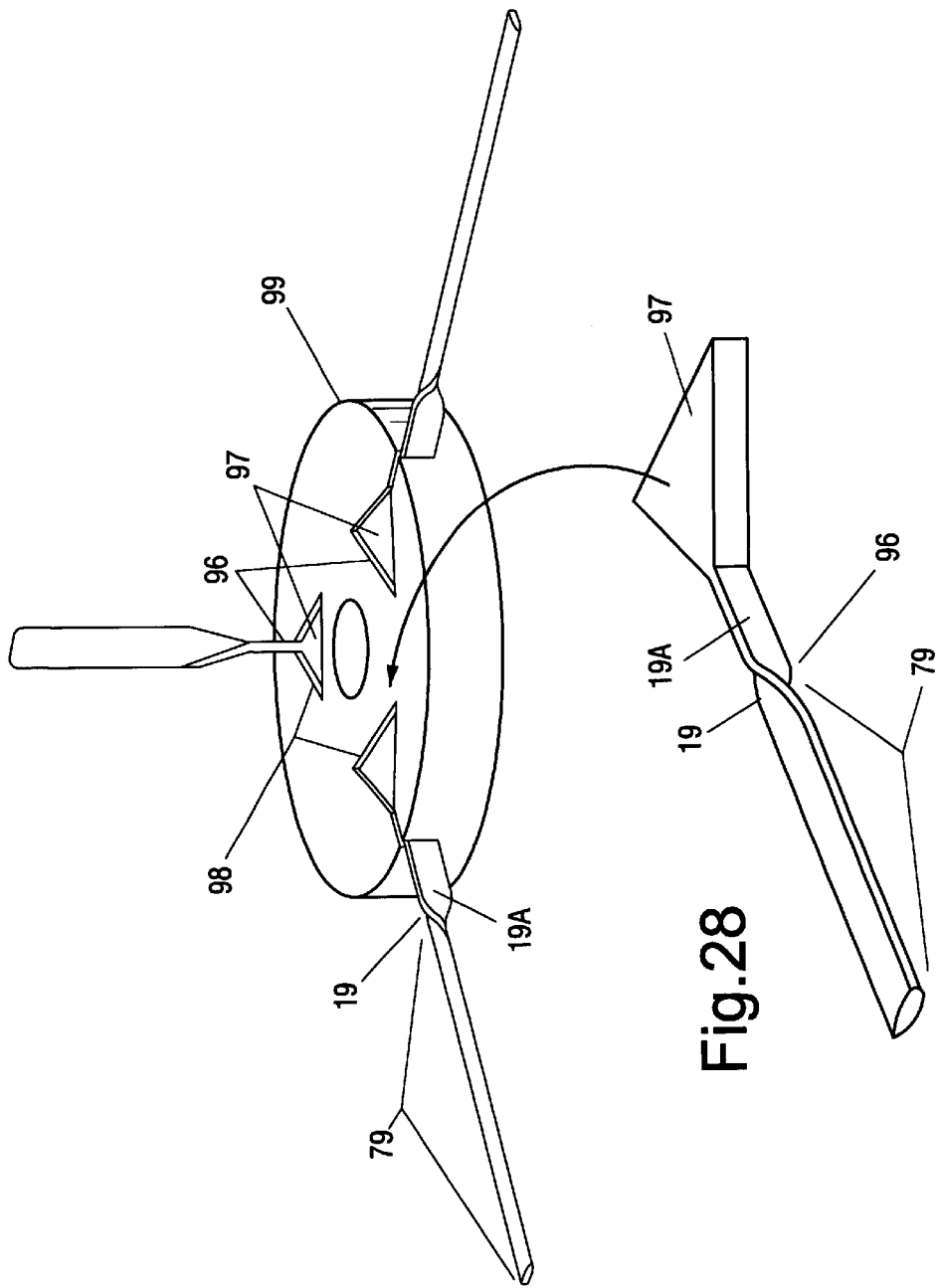

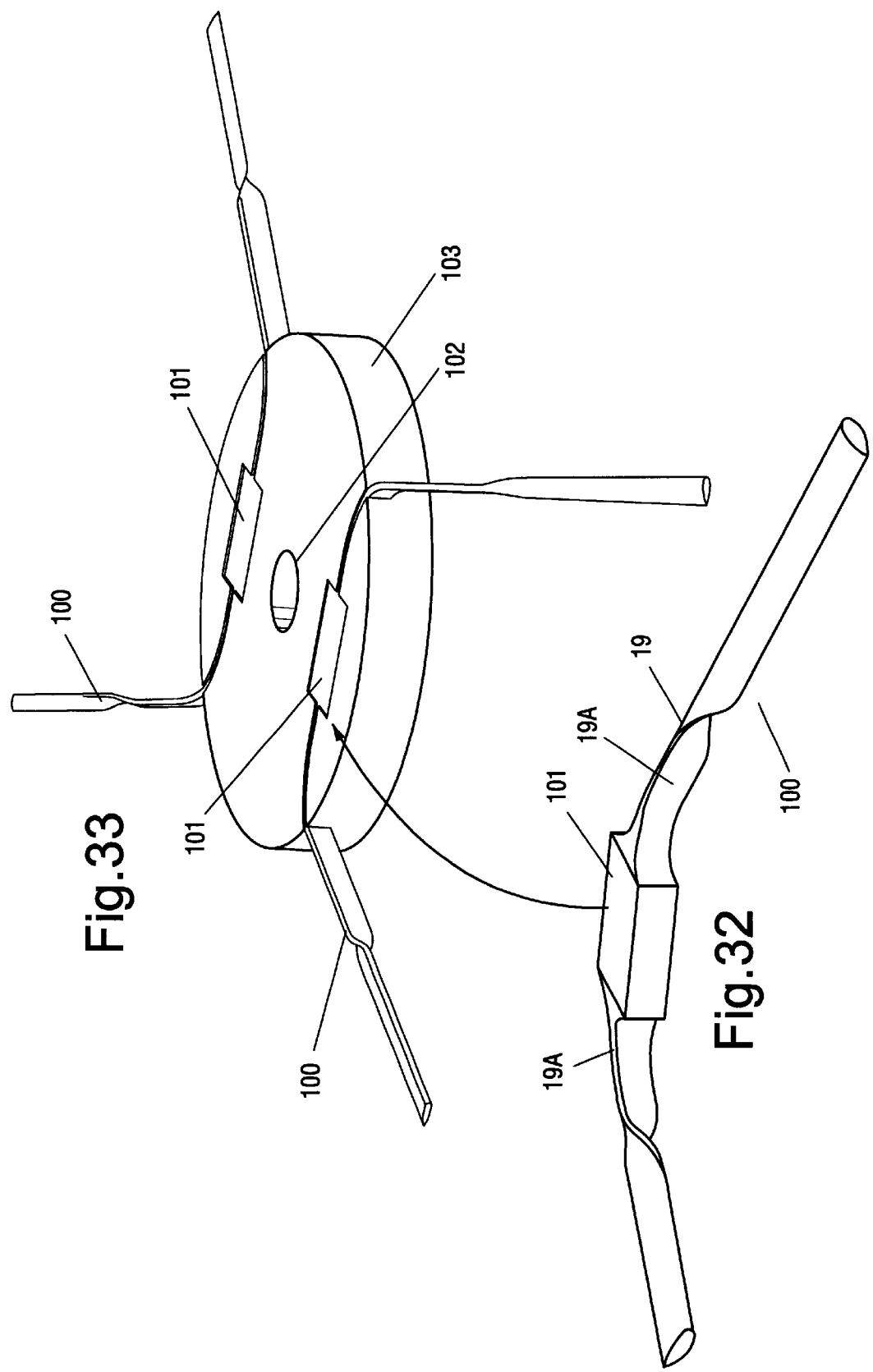

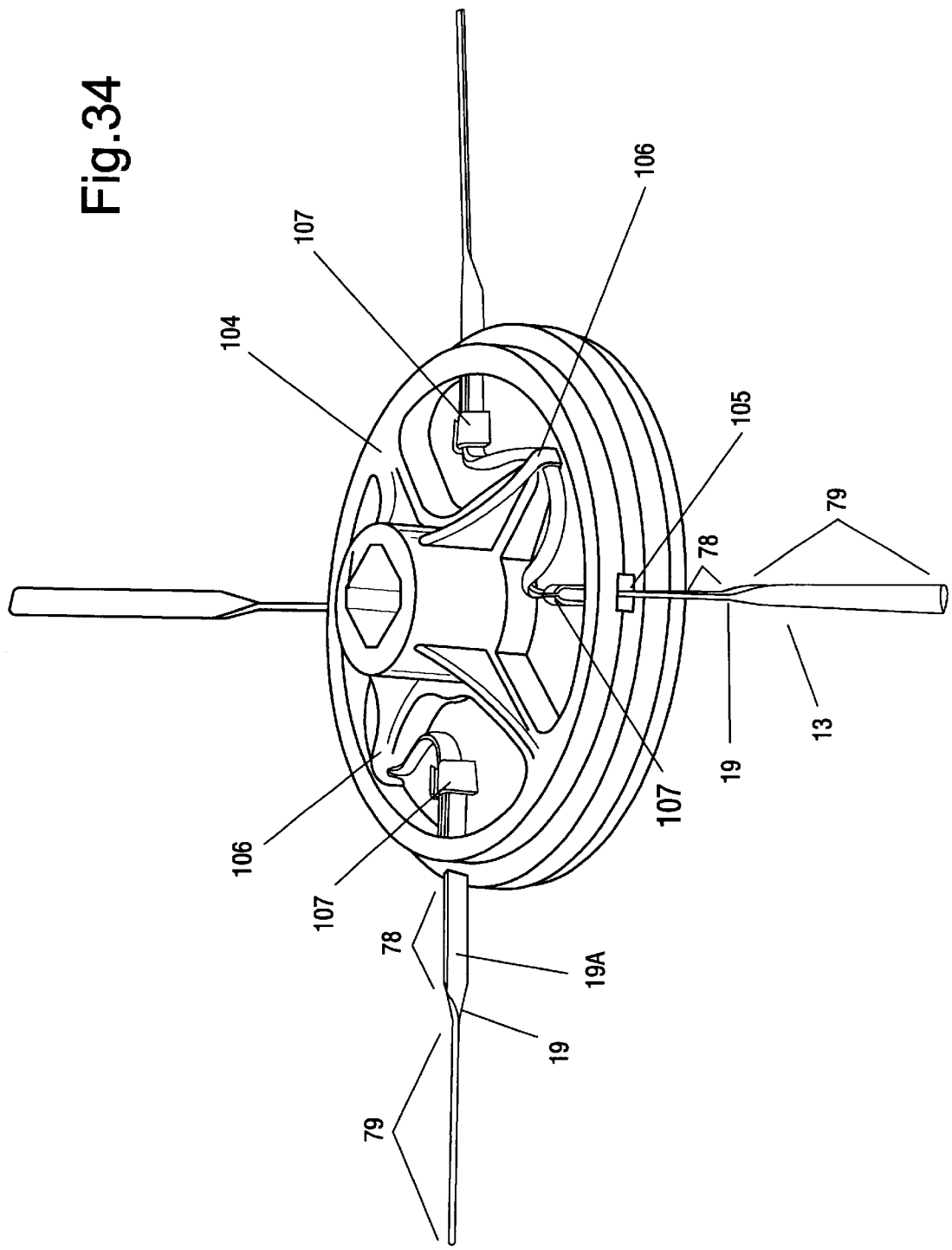

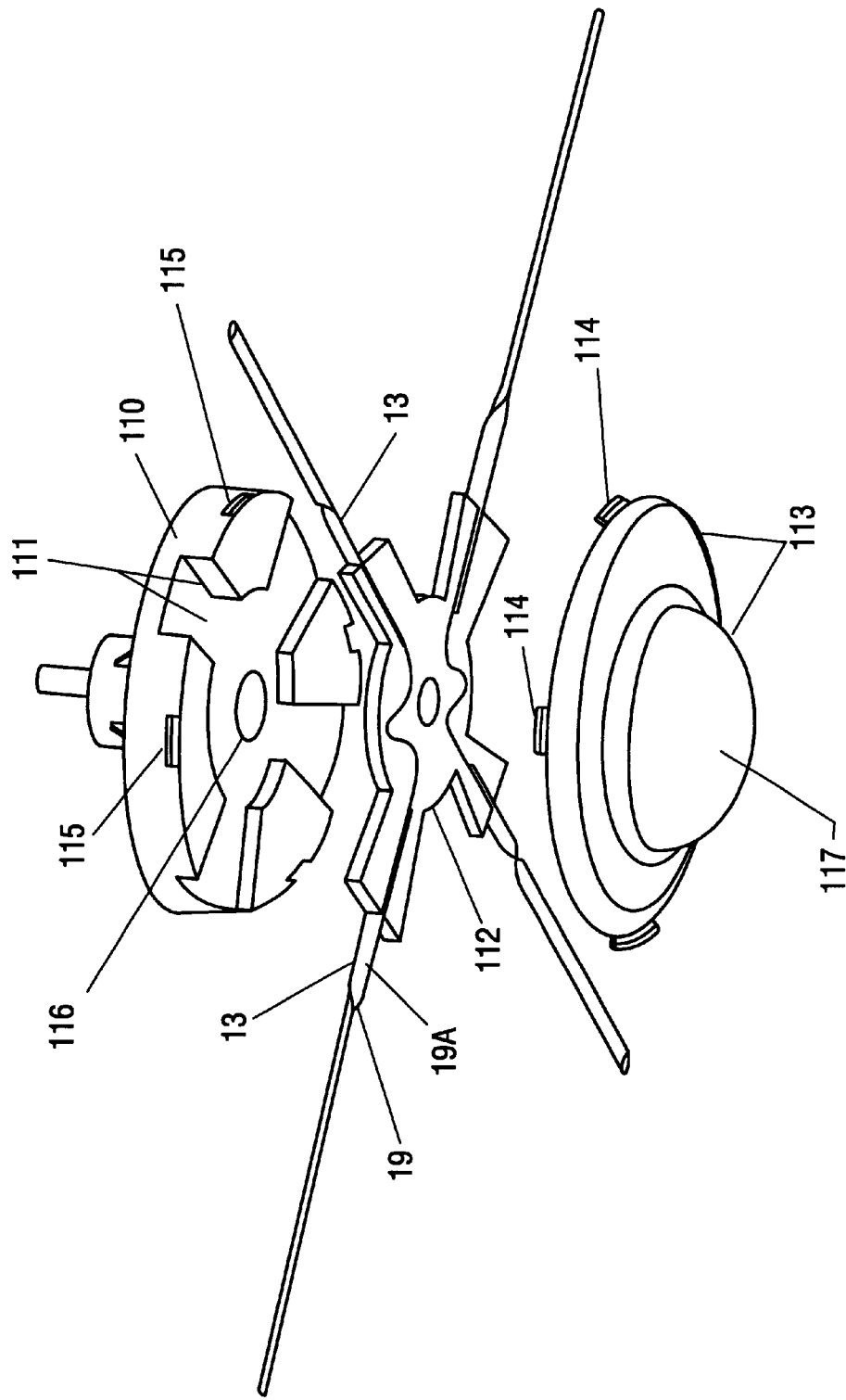

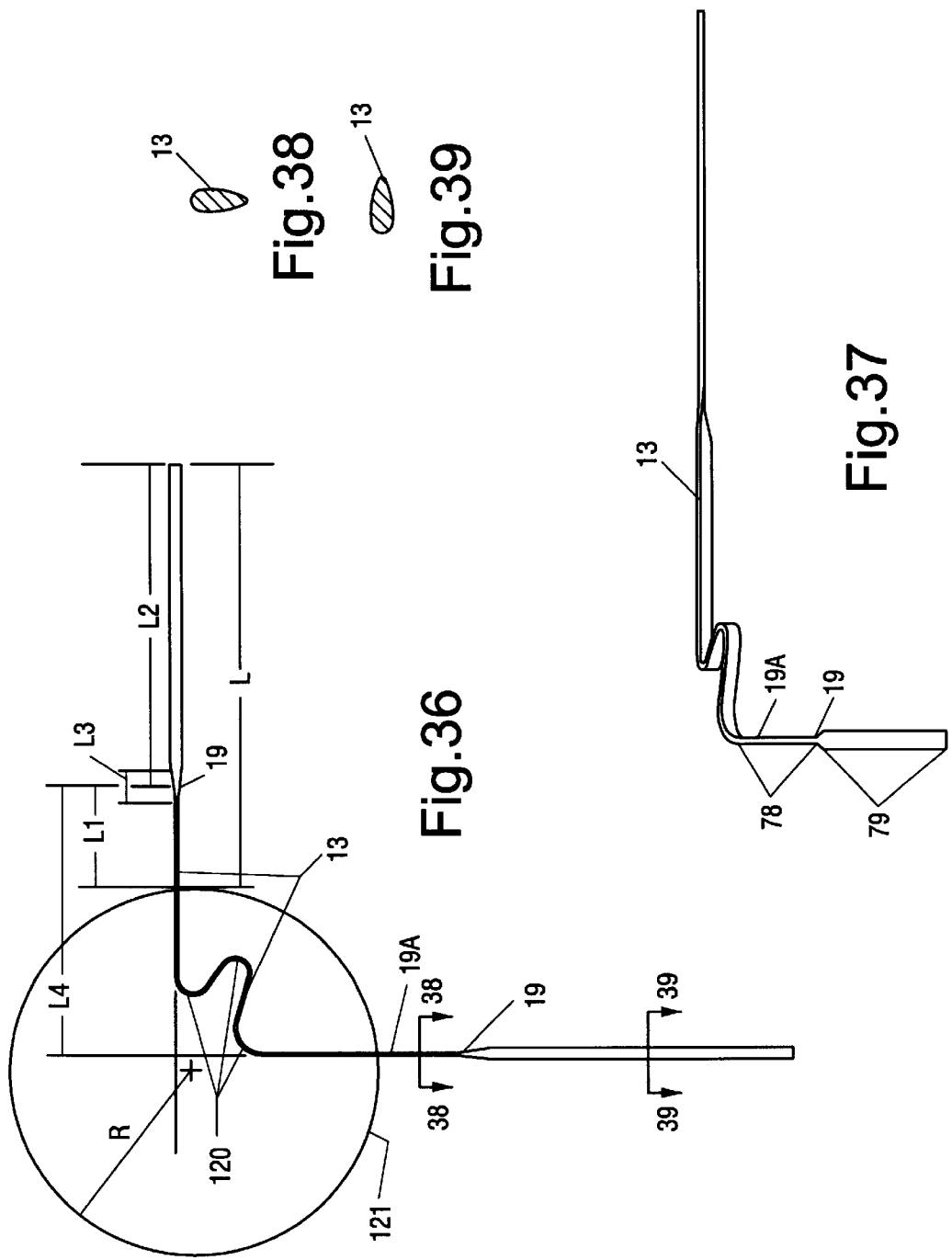

SELF-CONTAINED FLEXIBLE AERODYNAMIC CUTTING ELEMENT WITH MATCHING HEAD

CROSS-REFERENCE TO RELATED APPLICATION

This is a utility application based upon U.S. provisional applications serial no. 60/074,899 filed Feb. 17, 1998, and Ser. No. 60/103,549 filed Oct. 8, 1998.

BACKGROUND AND SUMMARY OF THE INVENTION

The invention relates in the development of aerodynamic flexible cutting string connectable to a rotating head for cutting vegetation, and a vegetation cutting head holding the aerodynamic string in place, and a method of cutting vegetation using a string. In vegetation cutters, such as shown in U.S. Pat. No. 5,761,816 (the disclosure of which is incorporated by reference herein), it is possible to achieve vastly improved cutting results and/or other advantages, in vegetation cutting string, devices, and methods by using an aerodynamic line.

An aerodynamic line (also known as a "string") has a beam structure comprising a strut-like cross section with a first axis which is the strongest axis and has the highest moment of inertia, and a second, weaker, axis. That is, the line has a minimum cross-sectional dimension less than 85% of the maximum cross-sectional dimension, or, for an ellipse, at least a 1.25 or 1.10 to 1 ratio (e.g. between 2:1 to 8:1), and movement in a direction perpendicular to the smaller dimension/axis. Drag-reducing surface texturing can also be provided.

The cross section of an aerodynamic line is typically an elongated shape that may be symmetrical (such as an ellipse or a diamond with rounded apices), or non-symmetrical and/or complex, such as a tear drop, simulating a spearhead comprising a small cross-sectional area rectangle merging into a larger cross-section area trapezoid, simulating a keyway having a smaller diameter circle merging into a large diameter circle, or having a small cross-sectional area trapezoid merging into a larger cross-section area trapezoid of substantially the same shape as the small trapezoid, simulating an ice-cream cone having a small cross-sectional dimension substantially cone-shaped portion merging into a larger cross-sectional dimension substantially parabola shaped portion, simulating a tear drop with an extension nose, or the like.

The aerodynamic cutting line employed in the invention is made up of primarily (more than 50%) or substantially (at least 90%) non-metallic material, such as high strength polymer or other material having similar characteristics. Some examples include nylon, Delrin, polyester, fiberglass, rubber, or rubber-like materials, and mixtures or combinations thereof. Preferably a material that can be heat set into various configurations is provided, such as nylon or nylon mixed with other materials (including fibers or fillers for increased wear resistance or strength).

The aerodynamic cutting line which is utilized in the invention, has a drag coefficient of less than 1.0, typically 0.8 or less, e.g. about 0.35 or less, when rotated about an axis of rotation so that the first axis thereof is positively maintained and moves in a predefined cutting plane, and the rotating string or line is brought into contact with the vegetation so that the cutting line is generally transverse to a portion of the vegetation to be cut, and the string cuts the vegetation. In one example, when the aerodynamic cutting string was asymmetrical and used has a dimension perpendicular to the direction of movement (e.g. the smallest axis) of about 0.08 inches, a vegetation cutter will use less than the equivalent of 0.4 horsepower (per string) at about 8000 rpm for a 17 inch swath, for a 4.5 inch diameter of the rotating head.

It is highly desirable to be able to positively locate the string during cutting action (that is provide pitch control during cutting). This is provided for extruded strings using a cooperating shaped eyelet or the like, or for molded strings by a larger cross-sectional dimension at the head than at the cutting portion of the string, the larger portion either the same or of different shape and with or without an eyelet. Sometimes undesirable stress can be introduced into the cutting line under these circumstances, which can shorten its life and cause it to lose pitch control.

According to the present invention, a flexible cutting line/string is provided which is formed with a twist therein, and is mounted in the head of a vegetation cutter at a portion opposite the twist from the actual cutting portion of the string. The provision of the twist, and mounting inward from the twist (the twist about 90° to the cutting plane), allow excellent pitch control while taking the stress off the aerodynamic cutting line, and additionally allow very simple replacement of the cutting line, and allow the utilization of extruded cutting string (which typically is cheaper and stronger than molded string).

As the line exits the 'V' groove of the head outlet, a large vertically oriented "living hinge" is provided and formed up to the twist so that if a solid barrier is impacted, the string can easily deflect with reduced stress on the cutting element, as well as reduction of the string trimmer thrust. In a preferred embodiment two twists are provided in pre-cut length of extruded primarily or substantially non-metallic flexible cutting line, with the string mounted between the two twists.

According to one aspect of the present invention, a method of cutting vegetation using a powered head rotatable about an axis of rotation, and at least one string of primarily non-metallic material having a first long axis and a second short axis, with the second axis less than 85% of the first axis, the string having at least one free end and at least one substantially permanent twist remote from the free end, is provided. The method comprises the steps of: (a) Mounting the string in the head at a first portion of the string so that the string extends radially outwardly from the head with the at least one free end remote from the head and a portion of the string on the opposite side of the free end from the twist operatively engaging the head, while orienting the string so that the first axis is substantially perpendicular to the axis of rotation. And, (b) powering the head about the axis of rotation so that the first axis is substantially maintained in a cutting plane substantially perpendicular to the axis of rotation, the living hinge and twist providing pitch control while allowing deflection of the string when impacting an object substantially incapable of being cut.

The head may include a groove or slot having a receiving dimension about at least as wide as the second axis but not as wide as the first axis. In this case step (a) is practiced so that the second axis of the string portion opposite the twist from the free end is received by the groove or slot which has its long axis generally perpendicular to the axis of rotation.

Typically the string has two twists therein, with a portion of the string between the twists, and step (a) is practiced to mount the portion of the string between the twists to the head. The head may be configured, and step (a) practiced, so that the free ends of the string are typically either about 90°, or about 135°, or about 180°, apart during the practice of step (b). Step (a) may in addition to using the groove or slot (or in place thereof) be practiced by clamping the string to the head, or other techniques may be utilized, such as adhesive tape, a material which solidifies but may be removed from the head by application of heat, a solvent, or the like, etc. The groove or slot may be non-linear and step (a) may be practiced by mounting the string so that it extends in the nonlinear groove or slot.

Utilizing the method of the invention it is possible to achieve effective cutting by rotating the head (and a tangential velocity of a free end of the string) at a slower speed than in conventional vegetation trimmers, thus saving on fuel (e.g. gasoline) or electrical energy (if the vegetation cutter is battery powered, or connected by a cord to a 120 volt source). Therefore step (b) may be practiced so that the free end of the string moves at a tangential velocity at least 5% lower (e.g. about 10%, or even more, lower) than the tangential velocity of the free end of a conventional round cross-section nylon string powered by the head, yet with the same or enhanced cutting action.

According to another aspect of the present invention a string primarily (or substantially) of non-metallic material (such as nylon), and either extruded or molded (but preferably extruded) is provided. The string has: a first long axis and a second short axis, with the second axis less than 85% of the first axis; a length of between about 5–25 inches; a first free end; a second end; and, a permanent living hinge and twist between the first and second ends.

Preferably the twist in the string is between about 30–150° (e.g. about 90°) so that the first axis on one side of the twist makes an angle with respect to the first axis on the other side of the twist of between about 30–150° (e.g. about 90°). Preferably the second end is also a free end, and there is a second living hinge and twist between the first and second ends, and a central portion between the first and second hinges. The central portion may be linear, or could be formed in a pre-determined non-linear shape (such as an S-shape for cooperation with a S-shaped groove or slot that may be asymmetrical or symmetrical). The string may have a wide variety of cross-sections, symmetrical or non-symmetrical (such as substantially a tear drop cross-section when non-symmetrical, or a substantially elliptical cross-section when symmetrical, with the first axis between 1.25–8 times as long as the second axis).

The string is typically in combination with the head of a vegetation cutter, the head rotatable about an axis, and having a retaining mechanism (such as a clamp, groove or slot, or the like as described above) which holds the string (e.g. engaging pre-formed flats and/or twists in the string) to the head on the opposite side of the twist from the free end of the string so that the free end is remote from the head, and so that the first axis of the string is substantially perpendicular to the axis of rotation of the head. Where the string has two twists in a central portion, the central portion is held by the head so that the free ends are remote from the head and so that the first axis of the string between each twist and the free end is substantially perpendicular to the axis of rotation. The string may be held to the head by a slot or groove and the head may have a string-receiving opening with a width substantially the same as or greater than the second axis but less than the first axis. The first and second free ends may be spaced approximately 90°, or approximately 180°, or other angle, apart during rotation of the head. A plurality of strings may be associated with any particular head.

The invention also relates to a vegetation cutter comprising the following components: A head, handle, and motor. A substantially non-metallic cutting string having at least a first free end, the capability of a drag coefficient of less than 0.8, a living hinge and twist, and a mounting portion opposite the free end from the twist. And, the cutting string mounting portion mounting the cutting string to the head so that the first free end is remote from the head and the cutting string has a drag coefficient of less than 0.8 when rotated by the head. The details of the cutting line, mount to the head, etc., may be as described above, and the drag co-efficient may be as low as about 0.35, or even less. The cutting string may be in a cartridge, and the head may mount the cartridge so that it is reversible, that is can be mounted with either face of the cartridge up or down.

According to another aspect of the present invention a method of making string for a vegetation cutter is provided. The method preferably comprises: (a) heating a section of a primarily non-metallic material string to at least its softening point; (b) twisting portions of the string on opposite sides of the heated section of (a) with respect to each other to introduce a twist into the string; and (c) cooling the string heated section to well below the softening point thereof while the twist is held therein so that the twist becomes permanently fixed in the string.

Preferably (a)–(c) are practiced with string that is non-round or non-symmetrical in cross section, and (b) and (c) are practiced to produce a twist of between 30–150° (preferably about 90°); and the method further comprises (d) using the string in a vegetation cutter. Preferably (d) is practiced by rotating the string at a slower speed (e.g. about 2500–7500 rpm, preferably about 3500–6500 rpm) than when using round, untwisted, symmetrical string with a vegetation cutter of the same size and type.

It is the primary object of the present invention to provide a highly advantageous cutting string, which when used in combination with a vegetation cutting head or in a method of cutting vegetation, has numerous advantageous results. This and other objects of the invention will become clear from an inspection of the detailed description of the invention and from the appended claims.

BRIEF DESCRIPTION OF THE DRAWINGS

FIGS. 1A and 1B are bottom plan schematic views of two different exemplary forms of primarily non-metallic cutting string and an associated vegetation cutter head, according to the invention;

FIG. 2 is a side schematic view of the head and string of FIG. 1A in association with a handle and motor;

FIGS. 3 and 4 are views like that of FIG. 1A only for other embodiments of strings and heads according to the invention;

FIGS. 5 through 20 are cross-sectional views of various configurations the cutting string may take according to the present invention;

FIG. 28 is a schematic perspective view of another form of a cutting string according to the invention;

FIG. 29 is a top perspective schematic view of cutting strings like that of FIG. 28 shown in a cooperating head;

FIG. 32 is a top perspective schematic view of another exemplary embodiment of a cutting string according to the present invention;

FIG. 33 is a view like that of FIG. 29 only utilizing the string of FIG. 32;

FIG. 34 is a top perspective schematic view of yet another embodiment of vegetation cutter head and cutting strings according to the invention;

FIG. 35 is a perspective schematic exploded view of another embodiment of a vegetation cutter head and cutting strings according to the present invention;

FIG. 36 is a bottom plan schematic view showing another exemplary cutting string according to the invention in association with a schematically illustrated head;

FIG. 37 is a bottom perspective view of the string per se of FIG. 36;

FIGS. 38 and 39 are cross-sectional views taken along lines 38—38 and 39—39, respectively, of the cutting string of FIG. 36;

DETAILED DESCRIPTION OF THE DRAWINGS

Figure 1A:
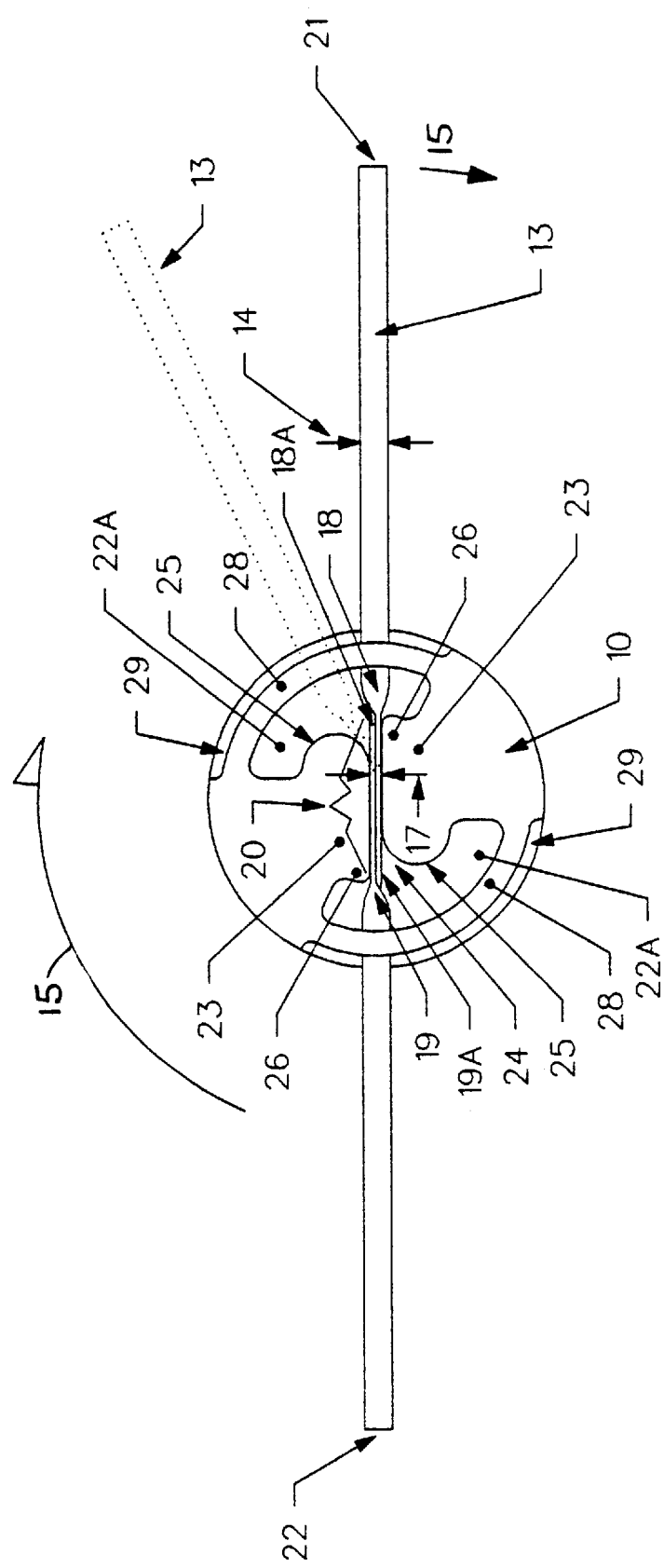

FIGS. 1A and 2 are bottom plan and schematic side views, respectively, of one exemplary form of a predetermined length flexible primarily non-metallic material vegetation cutting string according to the invention in association with a matching head of a vegetation cutter. The head, indicated generally by reference numeral 10 in FIGS. 1A and 2, is connected up in conventional manner to any suitable motor 11 (see FIG. 2), e.g. either gasoline powered, AC powered, or battery powered, and is manipulated by a conventional handle 12 having suitable motor activating controls thereon, as is conventional, such as shown in U.S. Pat. Nos. 4,571,831, 4,707,919, or 4,987,681. The head 10 according to the invention is specifically designed to accommodate the flexible string —shown generally at 13—according to the invention.

The string 13 is of a material described above and has an aerodynamic configuration. In the embodiment actually illustrated in FIGS. 1A and 2—as seen most clearly in FIG. 2—the cross-sectional configuration is roughly a 3:1 ratio ellipse or tear drop. The ellipse or tear drop has a first dimension or long axis 14 (see FIG. 1A) in the cutting plane, as it moves in the direction 15 about an axis 16 (see FIG. 2), and has a dimension 17 perpendicular to dimension in the cutting plane defined by the movement in direction 15, the ratio of 14:17 in the FIGS. 1A and 2 embodiment being about 3:1.

The flexible line 13 has at least a first twist 18 therein, preferably also a second twist 19 preferably substantially the same as the first twist 18 (although it can be in a different direction), or of opposite hand. The section 20 of the cutting line 13 is mounted by the head 10 and is remote from the distal ends 21, 22 of the line 13. The twists 18, 19 are introduced into the line 13 by heating the line 13 to soften it (or if it is already heated as a result of its formation/extrusion process, before cooling), then introducing a twist by holding one portion (20) stationary while the other portion or portions are twisted approximately (preferably exactly or almost exactly) 90°, and then letting the line 13 cool in that twisted configuration (containing the twists 18, 19).

Twisting at 90° normally is optimum, however for some special purposes (such as (but not limited to) intentionally putting drag on the line 13, or orienting it in a manner that will throw objects a particular direction (e.g. downwardly) or to add structure to reduce resonance or flapping or to direct air into a desired direction as a fan) the twist could be significantly more than (e.g. up to about 150°), or less than (e.g. perhaps as low as 30°), 90°. Depending upon the material of which the line 13 is constructed and the manufacturing technique, the temperature, cooling rate, and other details will vary. However, if the line 13 is all extruded nylon (the material of most conventional cutting lines) then it must be heated to, or be at, a temperature between about 250–350° F. at the time of twisting. Then it should be cooled by a cooling gas blast, liquid immersion or air cooled, etc. to substantially ambient temperature, or any other desired cooling or quenching temperature, or a like conventional technique relatively quickly to below the softening point thereof, e.g. to well below about 250° F., so that it sets in a configuration with the twists 18, 19 therein as illustrated in FIGS. 1A and 2. A typically pre-cut length of the line 13 where two distal portions 21, 22 exterior of the head 10 are to be provided, is about 5–25 inches, preferably about 7–16 inches, depending upon the power source 11 and the head 10, etc.

The line 13 can be twisted right at the extrusion nozzle, if extruded to size without the draw process conventionally used in making round or symmetrical string. An "S" shape (as in FIG. 1B) can also be set in the line 13 at or adjacent the nozzle too. The S shape may be retained in the line 13 after cooling. The twists may also be introduced into molded parts by the mold shape, such as in rings with a plurality of radially outwardly extending struts of primarily or substantially all non-metallic material, the twists at or adjacent the interface between the struts and rings.

The line 13 can be reheated to anneal it. Alternatives to form the twists 18, 19 are rotation, hammering, and pressing with a preformed tool or mold. Multiple twists 18, 19 can be provided, and at varied angles, to achieve the desired pitch. Also, see the description of the FIGS. 42–44 procedures.

The line 13 has living hinge sections 18A, 19A, respectively, associated with each twist 18, 19, between each twist 18, 19 and whatever surface or structure the line 13 engages to deflect or pivot about.

The FIG. 1A embodiment shows one construction of the head 10 for mounting the string 13 in a reduced stress configuration. The head 10 includes a bottom surface 22A from which extends downwardly a pair of mounting projections 23 defining a groove or slot 24 therebetween. The groove or slot 24 has a width substantially the same as the width 17 so that a close fit is provided between the walls of the projections 23 defining the groove or slot 24 and the exterior surface of the small dimension 17 portion of the line 13, at the section 20 thereof between the twists 18,19. The trailing ends 25 of each of the projections 23 in the direction of rotation 15 have a significant smooth curvature as illustrated in FIG. 1A to allow deflection with minimal stress of the line 13, e.g. to the dotted line position illustrated in FIG. 1A. The edges 26 of the projections 23, in the direction of rotation 15, have a much more stark or reduced curvature, and perform more of a supporting or guiding function. When the lines 13 hit an object, they are not capable of cutting, they are deflected to a position such as illustrated in dotted line in FIG. 1A (or to some intermediate position), with the sections 18A, 19A providing a "living hinge" action. This hinge action provides minimal stresses as the force is distributed over a long or wide area.

The living hinges 18A, 19A provide other advantages too. The hinges 18A, 19A reduce thrust, reduce the energy and likelihood of thrown objects, allow flex control of the string 23 (i.e. design of the stiffness or flexibility for particular heads 10 or motors 11 or uses thereof), and reduced energy of thrown objects.

In order to also assist in holding the element 13 in place as illustrated in FIGS. 1A and 2, and to protect it from bottom impact, while still allowing easy installation, the guides 28 are provided. A guide 28 also acts as a retainer in the event that no clasp (e.g. 31, hereafter described) is provided. These guides 28 are typically integral portions of the head 10 (e.g. a common plastic injection molding) which are substantially parallel to the bottom surface 22A and define therewith a slot 29 that has a dimension parallel to the axis 16 which is at least the dimension 17, and preferably slightly more. Alternatively, the elements 28 can be removed when not needed, or replaced by some method of clamping or by some sort of quick release fastener, detent or latching projections, or the like, or head 10 can be molded such that guides 28 are omitted.

In the embodiment of FIGS. 1A and 2, where a symmetrical cutting line 13 is provided, the user of the vegetation cutter removes the worn line 13, threads the distal ends 21, 22 of the new line 13 from a position near the center of the head 10 underneath the guides 28 through the slots 29, and then pulls on the distal ends 21, 22 and/or pushes down on the central portion 20 of the string 13 so that the central portion 20 enters the groove or slot 24 between the projections 23. Once an appropriate close sliding fit (of portion 20 in groove or slot 24) is obtained, the vegetation cutter is thus ready for use, the mounting projections 23 and hinge sections 18A, 19A and twists 18, 19 holding the line 13 so that the long axis 14 thereof is in the cutting plane as line 13 is moved in the direction 15 into contact with the vegetation to be cut, while the sections 18A, 19A act as living hinges to relieve stress upon deflection of the lines 13 by hitting an object not capable of being cut thereby. Twists 18 and 19 also help retain the line within the slot from being pulled through.

While FIGS. 1A and 2 show the invention with respect to a tear drop cross-section shape of the aerodynamic cutting line 13, similar constructions (with a different configuration of the groove or slot 24) may be provided with symmetrically shaped aerodynamic cutting lines 13 (e.g. ellipse shaped). Under these circumstances it may be necessary to provide some sort of indicia on the head 10, line 13, or both, to properly orient the line 13 in the head 10 so that the correct portion of the non-symmetrical line 13 is the leading edge thereof when rotating in the direction 15. For example, color coding, alphanumeric indicia, or asymmetrical control fixture portions, or the like, may be provided.

FIG. 1B shows a structure like that of FIG. 1A except that the groove or slot 24 has a non-linear configuration (e.g. S-shaped, or tortuous) so as to more positively hold the string 23 in place. Also abutments can be provided radially outwardly of the twists 18, 19 to engage the twists 18, 19 and to assist the non-linear groove or slot 24 in preventing radial movement of the string 13, e.g. in case the string 13 hits a snag which tends to pull the string out of contact with the head 10. The non-linear configuration of the groove or slot 24 can also be dimensioned and shaped so as to direct the line of flight of the string 13.

FIG. 3 illustrates an embodiment similar to that of FIGS. 1A and 2 except in this embodiment instead of, or in addition to, the groove or slot 24, a positive clamping mechanism is utilized to further hold the line 13 in place. In FIG. 3 structures that are the same as those in FIGS. 1A and 2 are shown by the same reference numerals.

The primary difference between the structure in FIG. 3 and that of FIGS. 1A and 2 is the utilization of the clasp 31 to assist in holding the line 13 in place, or in case the guides 28 are not utilized. While the clasp 31 may comprise any conventional construction, for that illustrated schematically in FIG. 3 a hinge mount 32 is provided pivotally mounting the hasp element 33 at one end thereof, while the opposite end 34 of the hasp element 33 has outwardly extending projections (not shown) making a snap connection with comparable surfaces (also not shown) in the projection 23. It is to be understood that any suitable clamping mechanism may be provided as the structure 31, such as in the Weedeater CLIPSTICK (which has a central metal slug), and the details thereof are per se conventional.

Also in the FIG. 3 configuration, the groove or slot 24 need not be substantially linear, but may have a non-linear configuration to provide additional friction holding capability (such as a modified S, or roughly sinusoidal, or other curvilinear, shape), as illustrated in FIG. 1B.

FIG. 4 illustrates another embodiment of the construction according to the invention in which components comparable, but not identical, to those illustrated in FIGS. 1A, 1B, 2 and 3 are shown by the same reference numeral only preceded by a "1". In this embodiment the lines 13 are the same, except that two lines 13 are provided, the head 110 being different. The head 110 comprises guides 128 which define slots 129, and three or four projections 123 are provided extending upwardly from the bottom 122A. The elements 123 define two curved grooves or slots 124, one for each center section 20 of a cutting line 13. The clasp 131 clamps both of the lines 13 in place, simultaneously.

In other modifications, a metallic sleeve or slug could be pressed onto the cutting element 13 in any of the embodiments to assist it in holding it in a groove or slot 24, 124. The positions of the twists 18, 19 can vary from those illustrated in FIGS. 1A, 1B, 2, 3, or 4. The groove or slot 24, 124 can vary circumferentially to act as both a pitch control guide and as a limit/stop to a deflected cutting element 13. The groove or slot 24, 124 can also be formed from a single piece head with contained grooves or slots or can be provided with multiple components. The groove or slot 24, 124 also can be—instead of located close to the center 10, 110—be closer to the periphery either adjacent, or taking the place of, the guides 28, 128, and the line 13 can be constructed so that it has only one twist 18 therein so that only one distal end 21 extends outwardly from the head 10.

FIGS. 5 through 20 show other exemplary configurations of aerodynamic cutting line cross sections that may be utilized for the line 13 in FIGS. 1 through 4. The lines of FIGS. 5 through 9 and 12 are symmetrical, and those of FIGS. 10, 11, and 13 through 20 are not symmetrical.

The line 40 in FIG. 5 is a 2:1 ellipse, the line 13 of FIG. 6 is the same as the line in FIGS. 1 through 3 only larger for clarity of illustration, being a 3:1 ellipse, the line 41 in FIG. 7 is a 4:1 ellipse, the line 42 in FIG. 8 is a 6:1 ellipse, and the line 43 in FIG. 9 is an 8:1 ellipse. The line 44 of FIG. 10 is a tear drop shaped line with a leading edge 45 that is more rounded than the trailing edge 46 that is more pointed (though edge 45 is more pointed than conventional round line), while the line 47 is the same as that of FIG. 10, only the leading edge 46 is pointed and the trailing edge 45 is more rounded.

Figure 13:
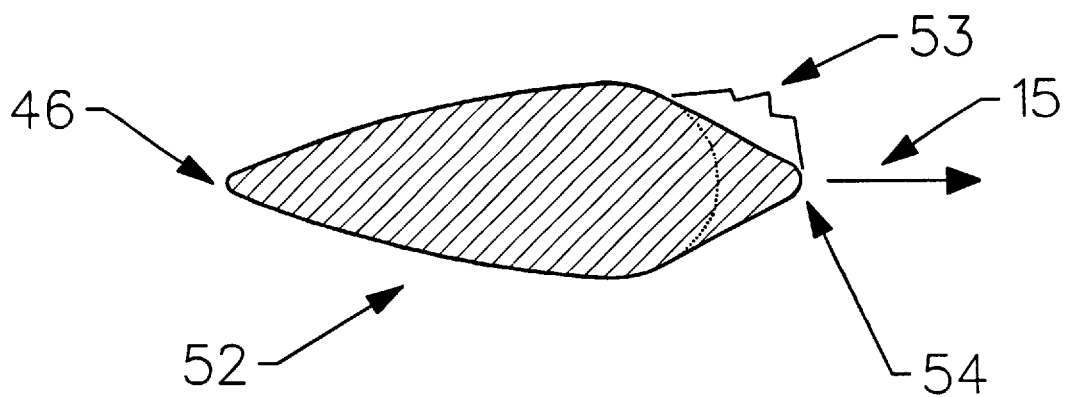
Figure 12:
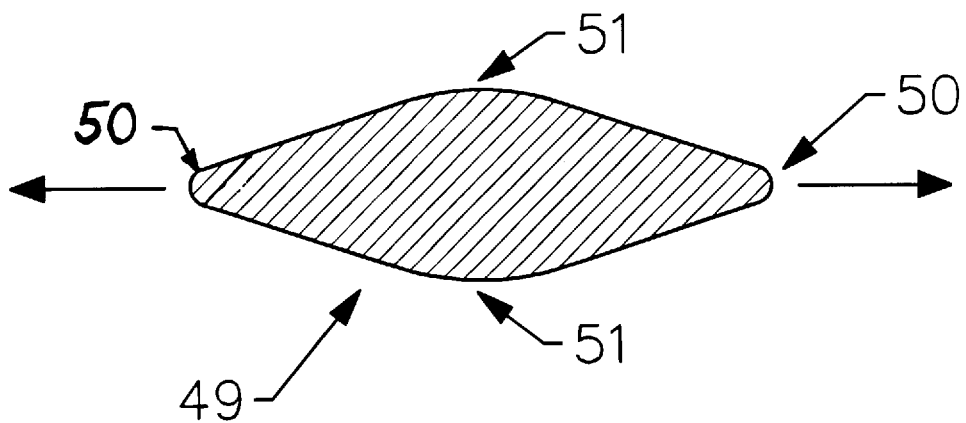

FIG. 12 illustrates a line 49 that has a substantially diamond shaped cross section, however, the apices 50 of the long dimension, which move in the cutting plane in direction 15, are rounded but with a high degree of curvature, while the apices 51 in the dimension substantially perpendicular to the cutting plane are also rounded but with a small degree of curvature. FIG. 13 shows a line 52 basically the same as line 44, only having a nose extension 53 having an apex 54 with a high degree of curvature, although not as high as that of the trailing edge 46.

Figure 14A:
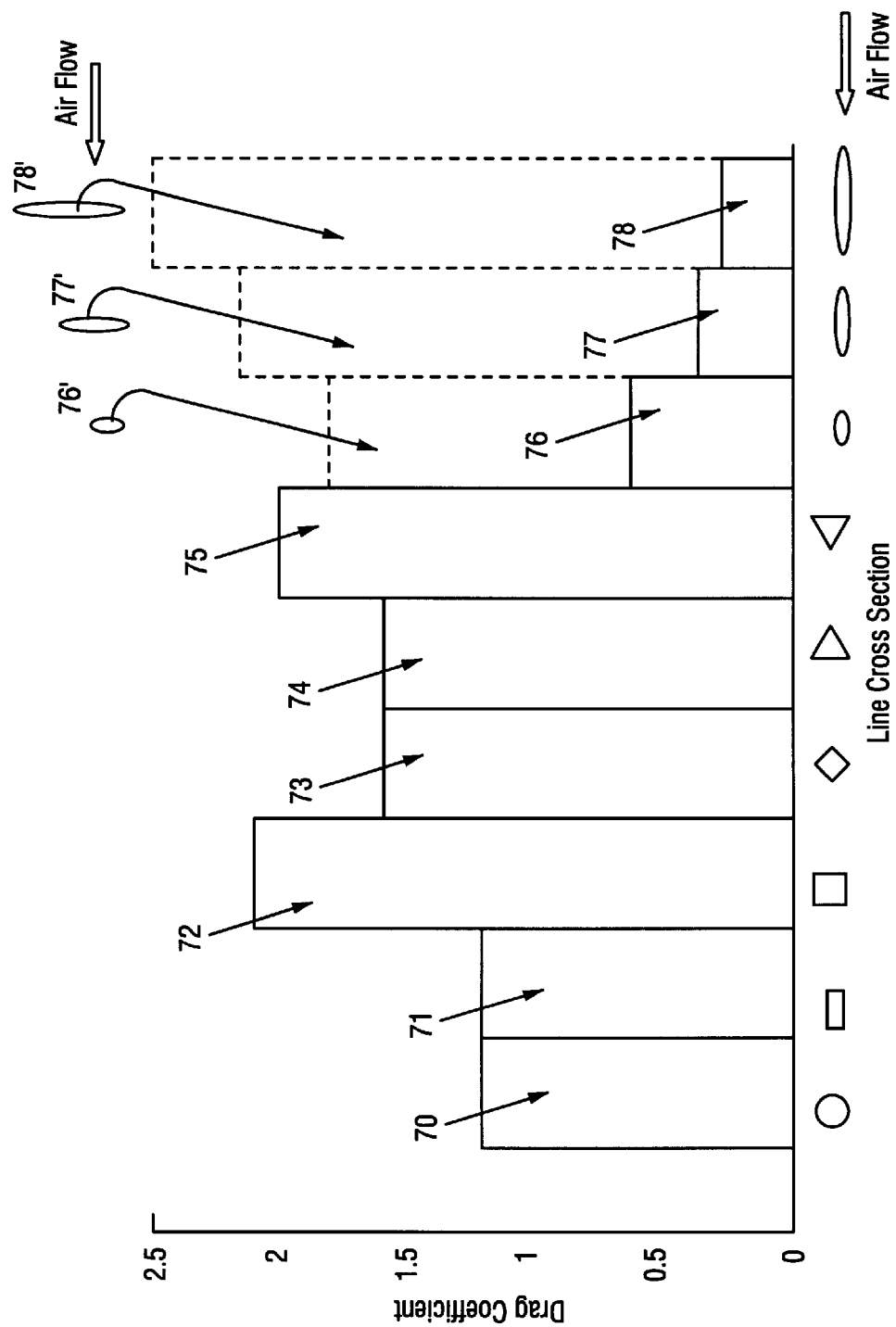

FIG. 14 shows an aerodynamic cutting string 56 which simulates a keyway having a small cross-sectional area trapezoid 57 merging into a larger cross-sectional area of trapezoid 58, preferably of substantially the same shape as the trapezoid 57. FIG. 15 illustrates an aerodynamic cutting line 59 which simulates a spearhead in cross-sectional configuration, having a small cross-sectional area rectangle 60 which merges into a larger cross-sectional area portion 61 which has a trapezoid configuration, and possibly, although less desirably, a parallelogram configuration 61.

FIG. 16 schematically illustrates an aerodynamic cutting line 62 having a smaller diameter circle 63 which merges into a larger diameter circle 64, the centers thereof being substantially concentric in the direction of movement 15 (which is in the cutting plane) during use.

Figure 17:
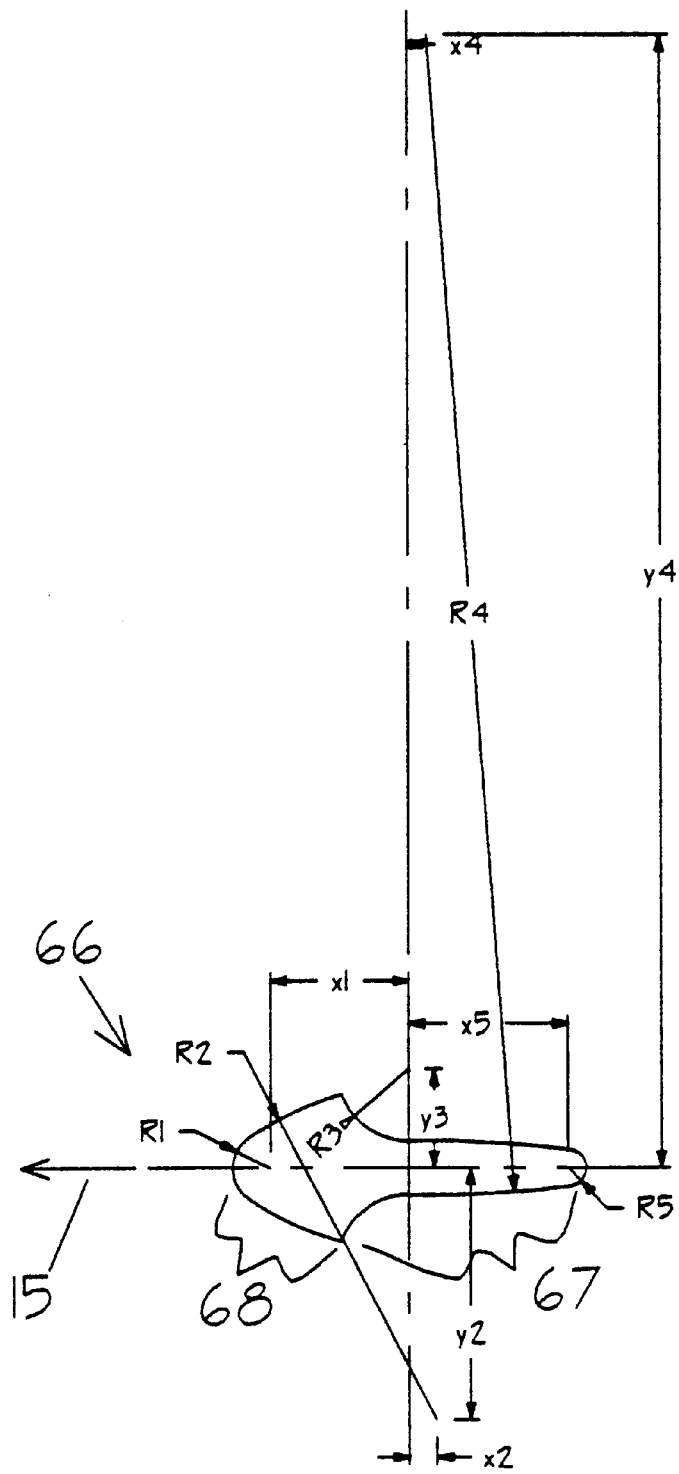

FIG. 17 illustrates a string 66 which simulates an ice-cream cone, having a small cross-section dimension perpendicular to that of the cutting plane defined by the direction of movement 15, substantially cone-shaped portion 67, primarily indicated by dimension x5 but possibly including dimension x2, which merges into a larger cross-sectional dimension (perpendicular to the plane defined by the direction 15) portion 68 which is substantially parabola shaped. A variety of different x and y directions are provided, as well as five differently radiused portions.

Figure 20:
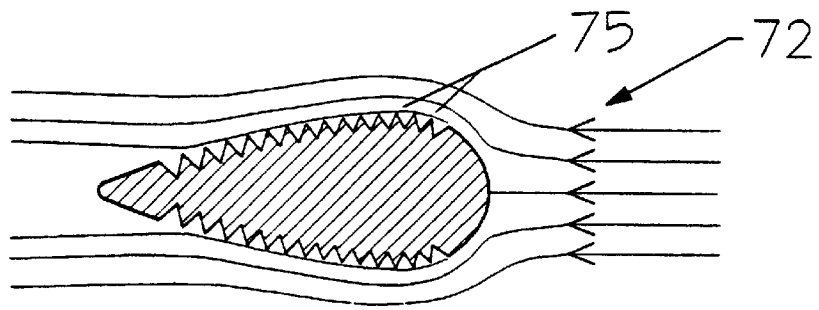
Figure 18:
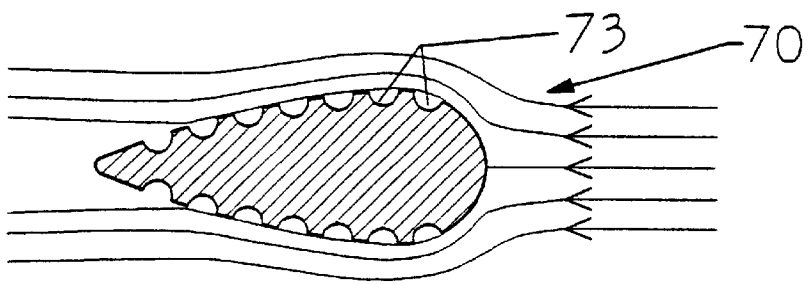
Figure 19:
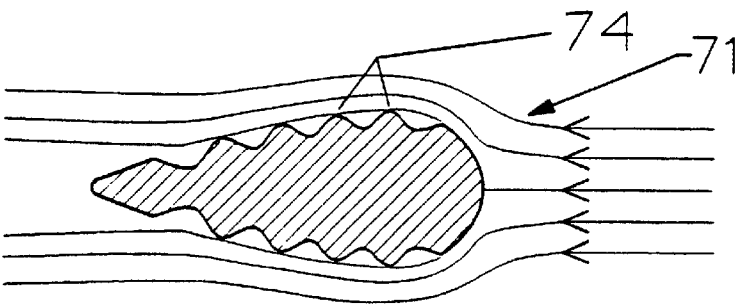

FIGS. 18 through 20 show cutting lines 70, 71, and 72, respectively, each being substantially tear drop shaped, but having surface texturing to reduce the coefficient of drag even further. For example, the texturing 73 of the line 70 simulates golf ball dimples, while the texturing 74 basically comprises waves with peaks and troughs, while the texturing 75 has a generally sawtooth configuration. The lines 70–72 may be extruded from polymeric plastic material, or may be injection molded, or after extrusion acting on the surfaces while the elements are still soft using mechanical means or fluid jets to form the surface configurations. The surface manifestations in the FIGS. 18 through 25 can be expected to have a drag coefficient at least about 2% (typically at least 5%) less than the drag coefficient of the same strut which has an exterior surface that is macroscopically smooth.

All of the configurations of FIGS. 5 through 20 have a drag coefficient of 1.0 or less, typically less than 0.8, and in fact typically about 0.35 or even less, and are maintained with proper pitch while being rotated about the axis 16 in the direction 15 to come into contact with vegetation and effect cutting thereof, and deflecting about the living hinge sections 18A, 19A when objects not capable of being cut are impacted. Also, this configuration allows less energy to be used than in conventional string trimmers. For example the free ends 21, 22 may move at a tangential velocity at least 5% (e.g. 10% or more) lower than that of the free end of a conventional round cross-section nylon string powered by the head 10, yet with the same or enhanced cutting action.

While it is preferred that the lines according to the invention be extruded, they also can be injection molded, or otherwise formed, with a desirable aerodynamic cross section, and with appropriate twists. Also, while the preferred mechanisms for holding the center portions 20 of the strings 13 in place have been illustrated, other mechanisms can be used in place of or in addition to those illustrated, such as radially (with respect to the axis 16) or otherwise linearly moving clamp elements, setting materials that can then be readily removed by application of heat, solvent, or the like, strips of pressure sensitive adhesive tape, or other types of conventional structures.

Some of the many other modifications and embodiments according to the present invention that the cutting head and cutting string according to the invention may have are illustrated in FIGS. 21 through 41. In each embodiment the living hinge section and twist are indicated by reference numerals 19A and 19, respectively.

Figure 21:
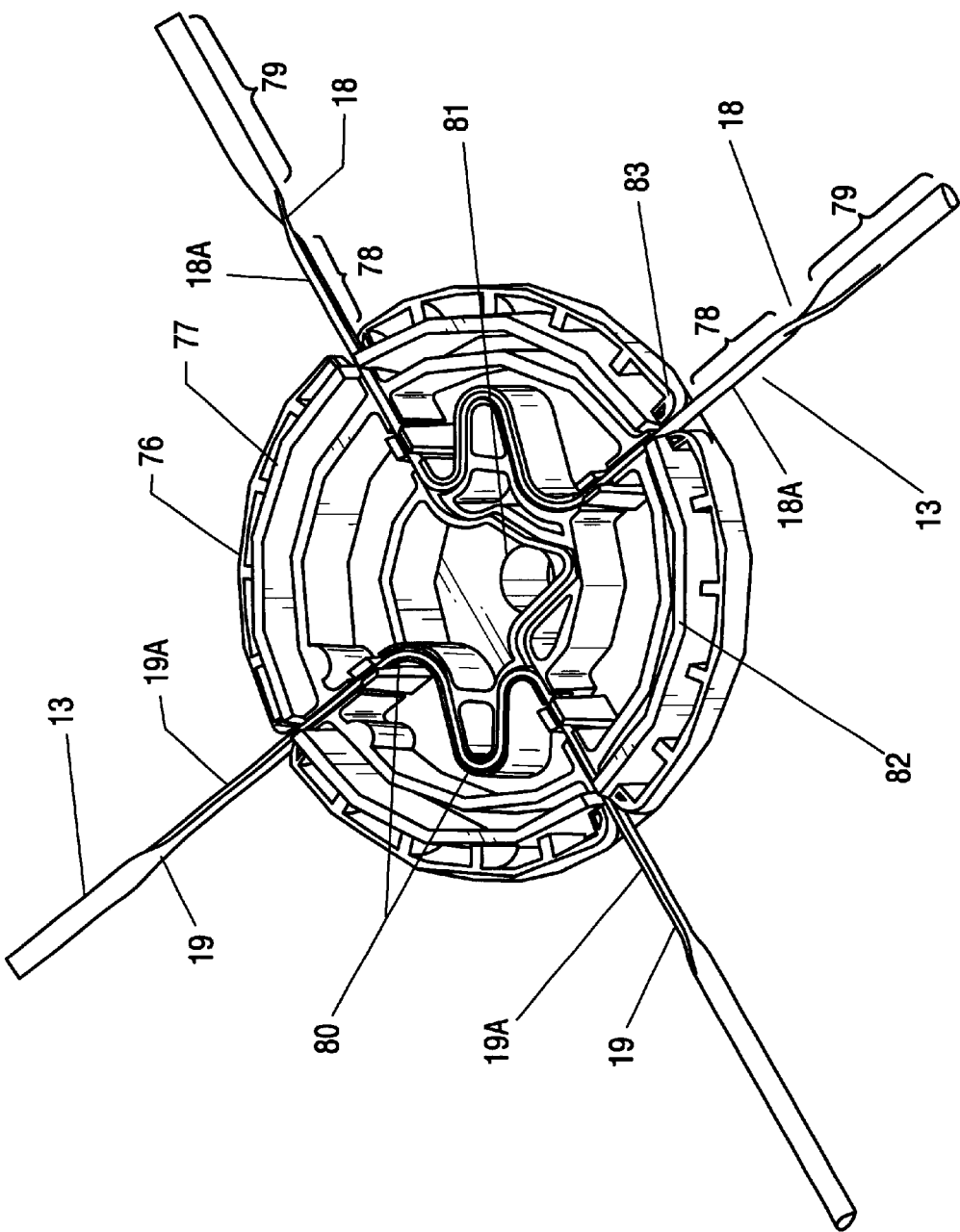
FIG. 21 is a bottom perspective view of the top part of another embodiment of a vegetation cutter head according to the invention, utilizing a cutting string with a flex hinge and twist according to the invention.

FIG. 21 shows a molded or metal cast cutting head which holds two cutting strings 13, each with two twists 19 and two living hinge sections 19A. In this embodiment the twists 19 are located exteriorly of the outlet and circumferential periphery 77 of the head 76, and a flex or living hinge 19A which includes section 78. Section 78 is provided between the radiused outlet 83 and the twist 19 at each of the two end sections of each cutting string 13. The end sections 79, those portions of the ends of the strings 13 past twists 19, perform the majority of the cutting action.

Figure 22:
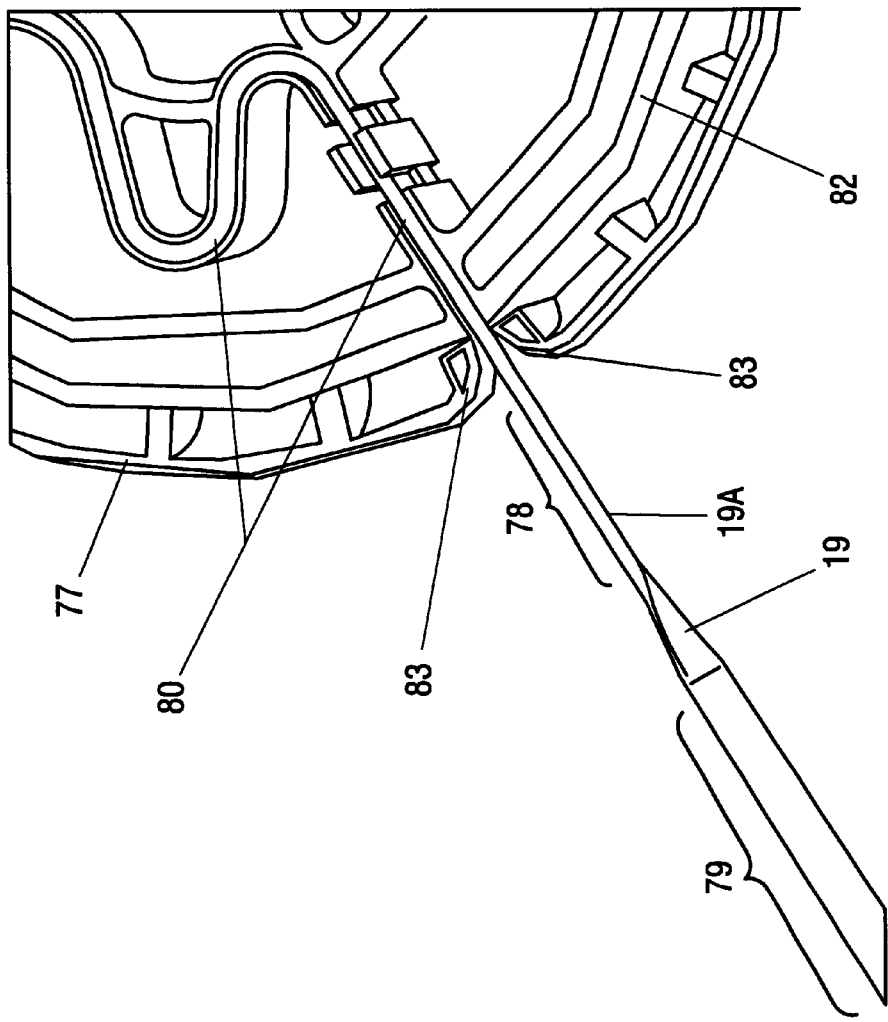
FIG. 22 is a detail view of the radiussed configuration of the string outlet where the cutting string extends from the head for the embodiment of FIG. 21.

In FIG. 21, slots 80 are provided to hold the strings 13 in place interiorly of the external periphery 77 of the head 76. The slots 80 preferably are V-shaped in order to firmly hold the strings 13 in place, preferably being dimensioned and configured to correspond specifically to the cross-sectional configuration of the sections of the strings 13 between the twists 19 thereof, and assymetrically mount the strings 13 to make orientation substantially foolproof. A central opening 81 in the head 76 receives a cap which closes off the open portions of the slots 80 and meshes with the circumferential ridge 82 molded in the head 76 to hold the strings 13 in place. The cap (e.g. see 84 in FIG. 23) that cooperates with the opening 81 can be screw threaded into place, or held in place by any other conventional arrangement.

Where the strings 13 extend exteriorly of the circumferential periphery 77 of the head 76 (providing the flex hinge portion 78), a radiussed eyelet, shown schematically at 83 in FIGS. 21 and 22, is provided. When the flex hinge (living hinge) portion 78 flexes or bends around the radiussed eyelet 83, the line stress in operation is reduced. Also, because of the construction illustrated, which includes the V-shaped slots 80, air cooling of the slots 80 is provided to cool the contact and flex points of the cutting strings 13. The provision of the V-shaped slots 80, the hinge section 78, and the cooperation with the cap (e.g. see 84 in FIG. 23), also reduces or eliminates resonance or flutter of the strings 13.

Figure 23:
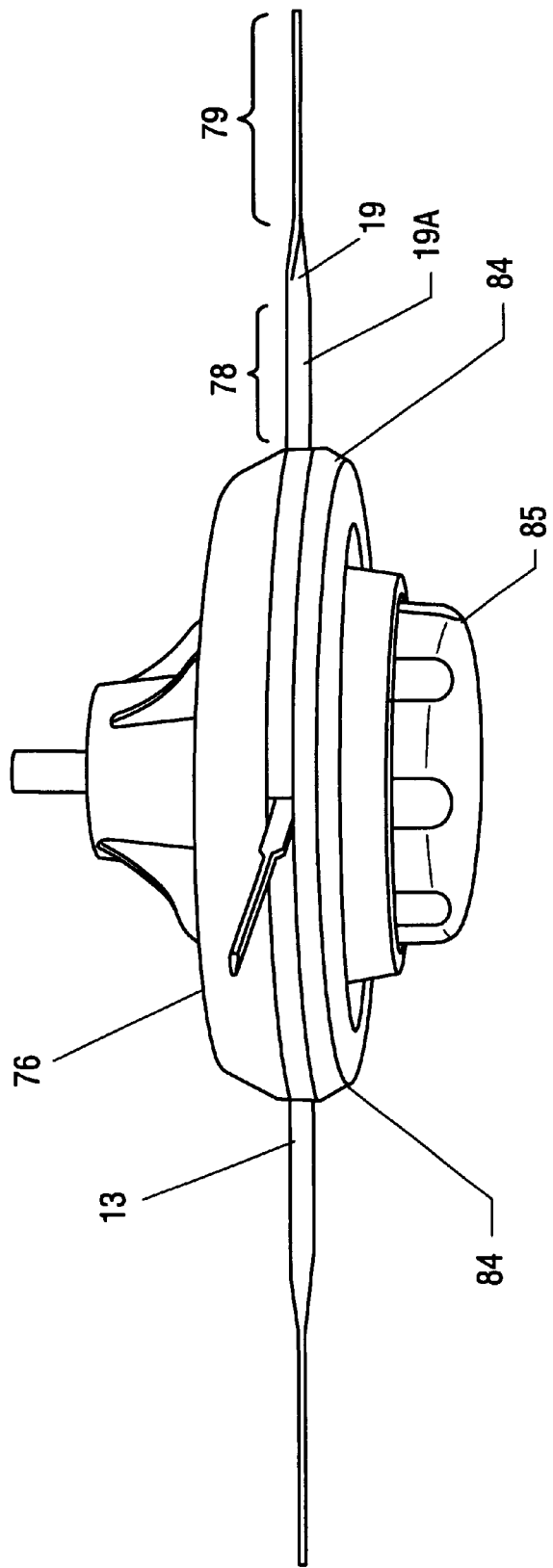
FIG. 23 is a side plan schematic view of the head of FIGS. 21 and 22 assembled on a string trimmer.

FIG. 23 shows the head 76 with a cap 84 in place closing off the open ends of the slots 80, and with a knob 85 located centrally of the cap 84 and containing the projection (such as a threaded shaft) that cooperates with the opening 81.

Figure 24:
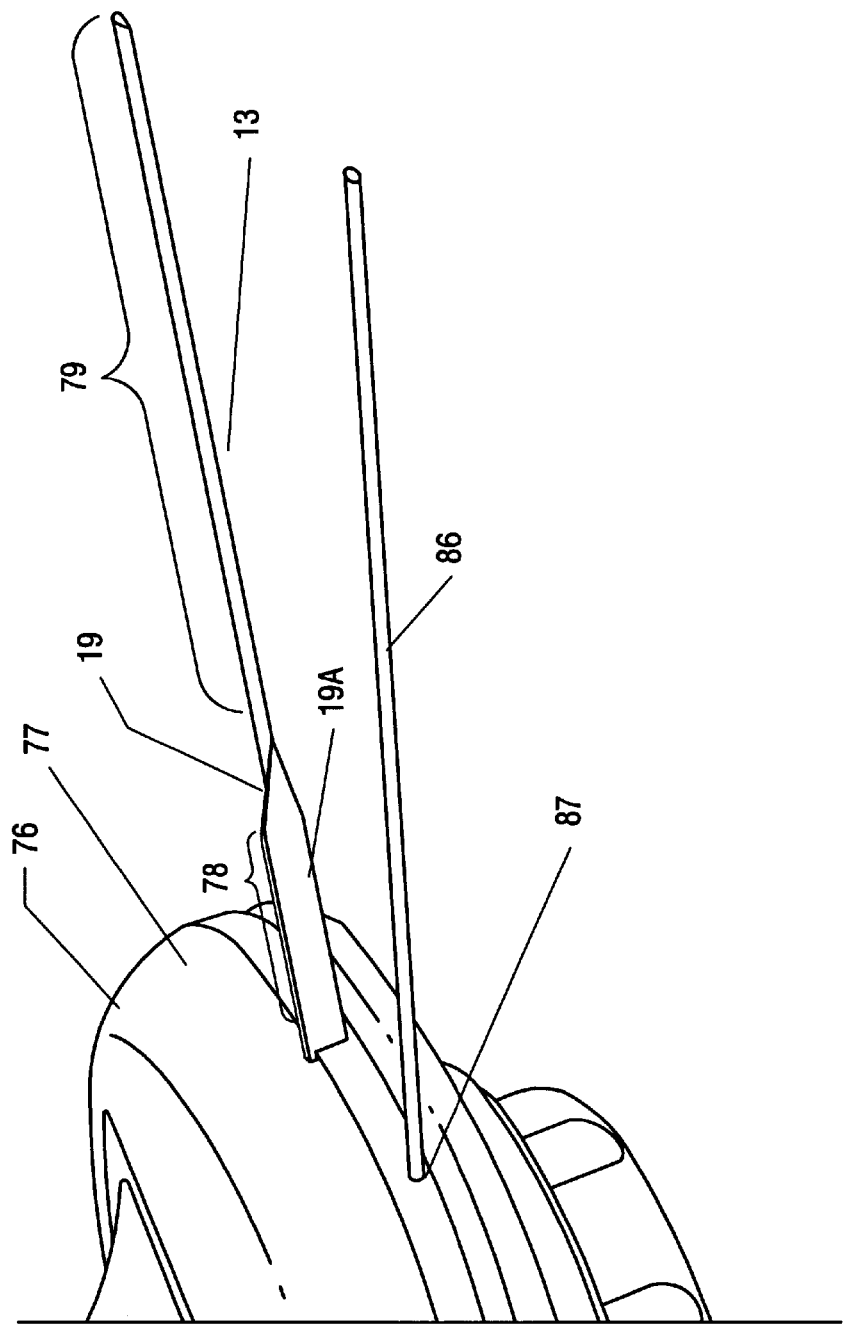
FIG. 24 is a schematic illustration showing the differences between a cutting string assembly according to the invention and a conventional prior art cutting string.

FIG. 24 is a schematic illustration comparing cutting string 13 according to the invention, to a conventional round cutting string 86. The conventional round string 86 provides a narrow/weak beam with a low centrifugal force. A small eyelet area 87 with a sharp radius is provided with small areas of contact that creates high stress concentration. The cutting string 13 according to the invention, on the other hand, has a strong beam cutting section 79 with a greater volume of material/length, which provides a large centrifugal force (much greater than the round line 86). Also a large eyelet area 83 is provided, providing a large surface area to reduce stress, particularly when radiussed as illustrated in FIGS. 21 and 22.

It has been found that according to the present invention a two line (cutting string 13) head (four lines are illustrated in FIG. 21) has a number of advantages over two line conventional cutting strings 86. The advantages are the stress relieved design, multiple times wear life, simple head design, a strong line blade, simple and easy line changes with a much less frequent need to change, multiple line options to hit vegetation more frequently, and a quieter and smoother operation. Also the lines 13 according to the invention can be "tuned" to the power head for maximum efficiency, and can have multiple usage such as for trimming, edging, and —if reoriented—for blowing or sweeping.

When using a four line cutting string (as seen in FIG. 21) according to the present invention, there are still further additional advantages over two line conventional construction. These include that for the same speed the "hits" by the lines on vegetation are double, there are more "hits" at a lower speed, the grass or other vegetation has less time to get back to a relaxed position, the same amount of power can drive the additional two lines, there is better precision cutting, a better match to the power curve, and more line power delivered per revolution.

The cutting line 13 according to the invention has been shown in some tests and calculations to last at least 25–42 times longer than the conventional line 86. This is because more line power is delivered to the cut, there is more absorption of force over more cutters, there is better alignment due to the rigidity of the beam portion 79, there is a greater concentration of mass, there is a greater abrasion surface area, and lower operating stresses at the eyelet 83 and tip.

Also cutting line 13 according to the invention is easy to load because the preformed slots 80 provide an obvious and simple indication of how the line is to be inserted, and it can be inserted merely by drop in. Also, the lines cannot be installed in the wrong manner because of the "keyed" construction. Also, retainer tabs hold the line during assembly in some embodiments, and there are no moving parts or springs, and the slots 80 orient and secure the strings 13.

The cutting lines 13 according to the present invention typically do not use a supply reel or a bump feed. Because the conventional round line 86 is too weak, it is over stressed and needs continuous feeding from its reservoir. However, because there is at least a 25 to 42:1 wear difference compared to conventional line 86 for the line 13 according to the invention, there is no need for a complex, and costly, supply reel, or cutoff razor. This makes the construction according to the invention more compact and simplified. Also, the use of four cutting lines instead of two spreads out the wear.

The cutting lines 13 and head 76 according to the invention are smoother and quieter because of the balanced and symmetrical system and the reduction of aerodynamic friction and turbulence. The head 76 can be precision design balanced, and the strings 13 are balanced by mass and symmetry. As the strings 13 wear, balance is maintained. Even if there is slightly uneven wear, there will be only a fraction of the vibration experienced with conventional line systems. Also, the high tech air flow reduces noise, reduces pressure drag, reduces skin friction, and reduces downstream air disruption and expansion. Also, the lines 13 cut very well at lower speeds which also provides additional reduction in noise and vibration.

The strings 13 according to the invention can work at either high or low speed. For example, they can work optimally at head 76 speeds of from 2500–7500 rpm (and all narrower ranges within that broader range, e.g. 2500–3500, 4500–5500, 4800–6400, etc.). The round conventional line 86 requires high speed to create enough centrifugal force to create its beam or strength for cutting, while the strings 13 according to the invention have a naturally strong beam to begin with and because of the higher mass reaches higher centrifugal force at lower speeds. Also, the provision of additional strings 13 increases the number of hits with higher kinetic energy to hit the grass or other vegetation, and the front or leading section of the cutter faces are "sharper" than a conventional line 86.

It has been found according to the present invention for conventional engine applications that about a 15–17 inch (e.g. about 16 inch) cutting swath is optimum. At about 15–17 inches the strings 13 reach the highest tip speed, provide better precision control for the operator, and provide optimum power usage and minimum drag. Also, the guards utilized with the head then do not need to be as big and bulky as when there are bigger swath sizes. While the invention can certainly be extended to greater diameter swaths (e.g. even up to 24–27 inches), except when used by some landscapers for lawn manicuring there is no need to do so. Greater diameters may overload certain engines that lack sufficient torque and mass inertia.

The cutting strings 13 according to the invention outperform conventional flail heads/blades (such as strings 86) for a number of reasons. The living hinge section 19A in addition to the twist 19 eliminates pins and joints, and extends the cutting length to acquire higher tip speeds. Also, the superior strength of the extrusion of the cutting lines 13 compared to the lines 86 provides increased performance, and flail heads generally do not exceed a 12 inch swath diameter for optimal operation while the cutting strings 13 according to the invention are best tuned for about 15–17 inch (e.g. about 16 inch) swath diameters. Flail blades are also not as acceptable and cannot take heavy impact against concrete, rocks, posts, fences or other strong obstructions while the cutting strings 13 according to the invention (including because of the living hinges 19A) can withstand such extreme impacts.

A unique comparative wear test was completed on a Shindaiwa T20 trimmer using two conventional 0.095 round lines (86) made of Shakespeare's best known co-polymer blend (MN7) extended to a 16 inch swath, and four (0.080"× 0.240" known as 6′′′′′) cutting string 13 according to the invention with a lesser material strength compared to the MN7. At wide-open throttle, the two 0.095 conventional round line completely wore very rapidly (in less than 1.5 seconds) when plunged directly into a telephone pole and likewise when directly plunged into concrete. The four strings 13 of the invention (0.080×0.240) in the same conditions continued to operate over an extended time period (greater than 40 seconds) with more reasonable wear and enhanced cutting ability. This 40/1.5 ratio equals 26.6 which emphasizes an enormous wear benefit by strings 13 of the invention in the most abrasive conditions while at the same time using an equivalent or even inferior co-polymer material.

Likewise, grass edging (along a brick walkway) comparisons were completed on the same unit. Conventional round line 86 edged 35–40 ft., consumed a total of 12 inches of line after three necessary extensions while experiencing line welding inside the spool, two broken lines at the eyelet, and produced an undesirably wide path. This results in a rate of 1.5 lineal ft. trimmed per inch of line consumed. The four strings 13 of the invention extended to the same swath diameter cleanly and tightly edged 187 ft. of the same walkway without need to replenish or feed line at only ¾" wear per line or a combined total of 3" of wear, leaving a rate of 62.3 linear feet per inch of wear. This ratio 62.33/1.5 equals 41.55 rounded to 42.

Figure 25:
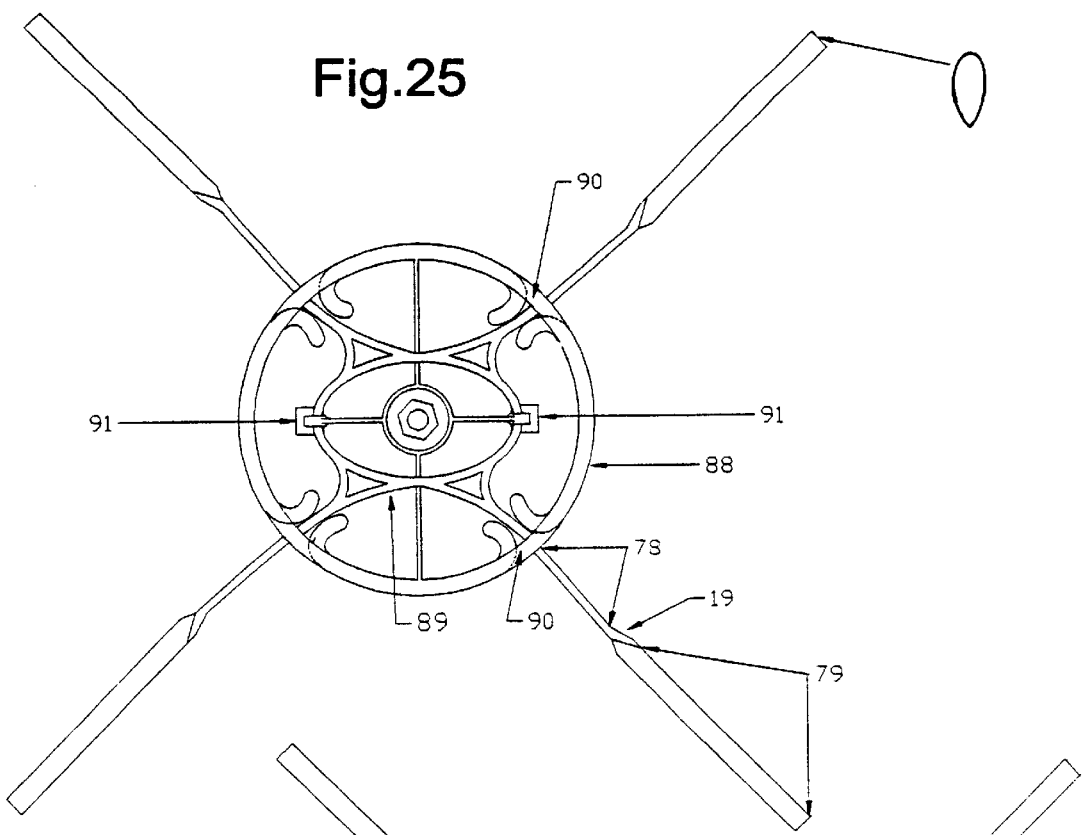
FIG. 25 is a bottom plan schematic view of another exemplary embodiment of a primarily non-metallic cutting string and associated vegetation cutter head according to the invention.
Figure 26:
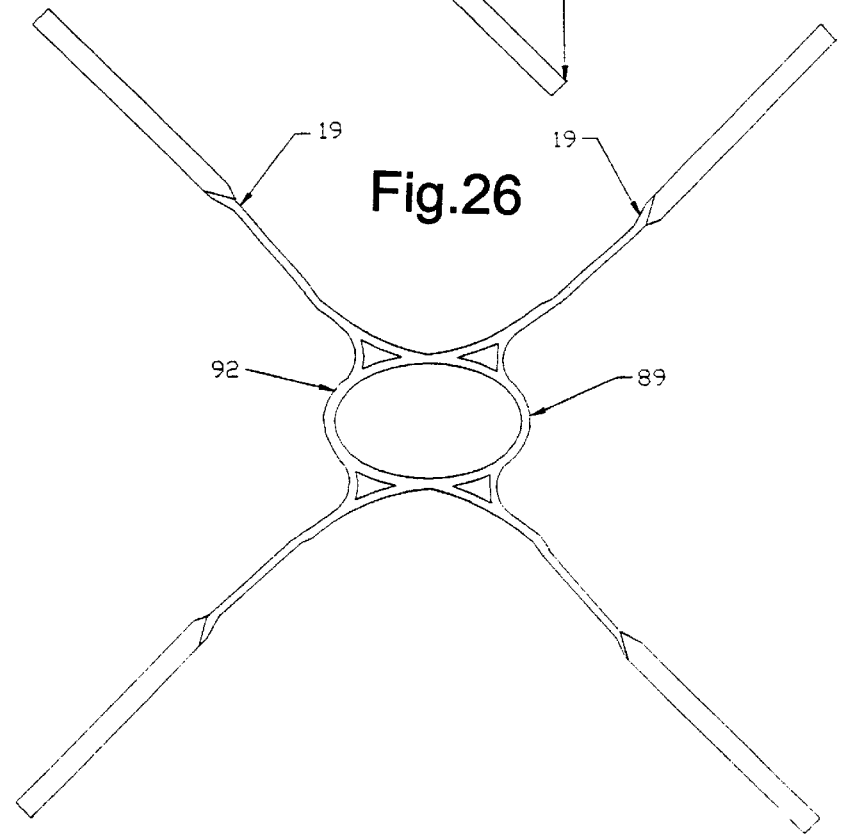
FIG. 26 is a schematic perspective view of the cutting string assembly per se of the construction of FIG. 25.

FIG. 25 illustrates a head 88 with an integrally molded four string construction 89 mounted therein including radiussed eyelets 90 and positioning studs 91 with the central section 92 shown in FIG. 26 of the integrally molded (cartridge-like) construction 89 properly positioning the cutting elements in place.

Figure 27:
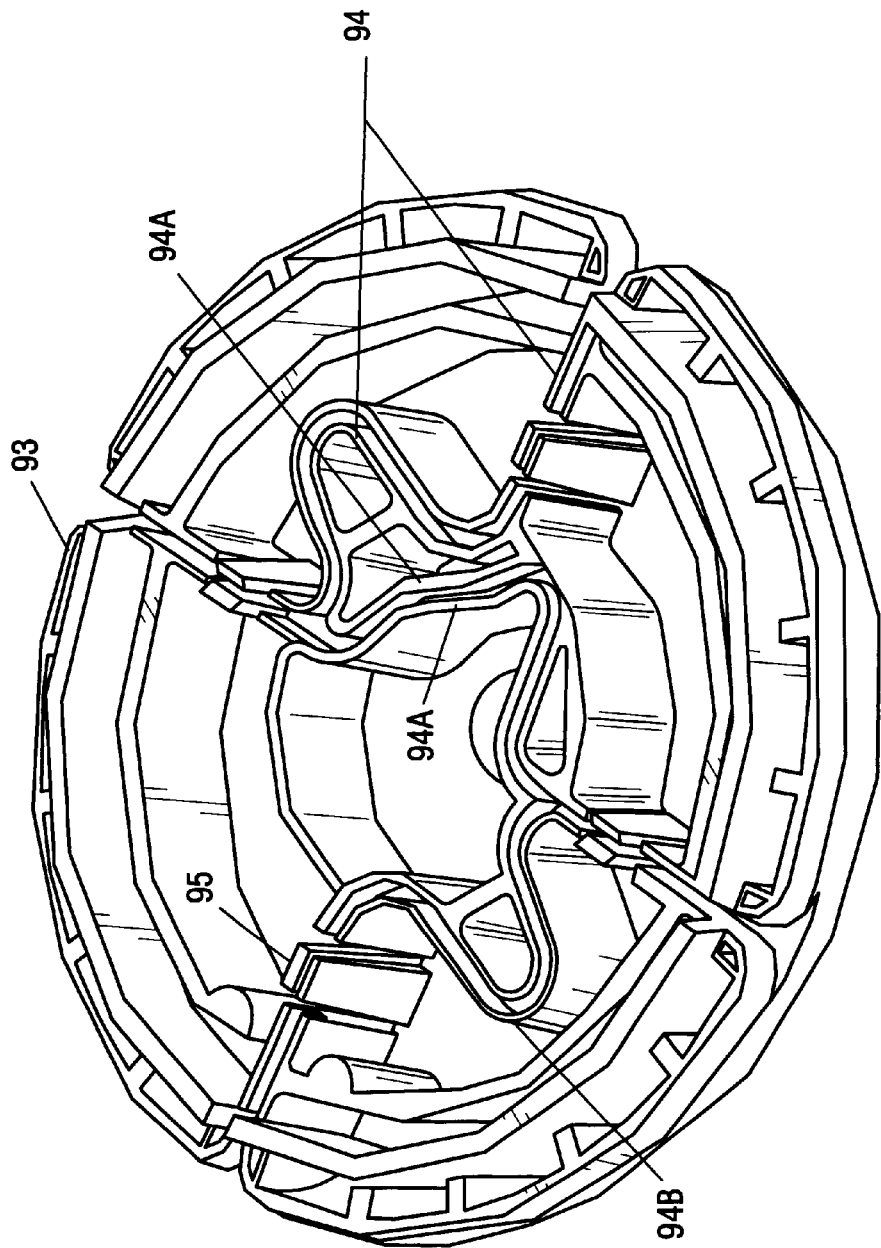
FIG. 27 is a bottom perspective schematic view of another embodiment of a head for utilizing a cutting string according to the invention.

FIG. 27 shows another head construction 93 similar to the construction 76 only showing different patterns of slots 94 with holding elements 95 therein, to allow different types of threadings of cutting strings 13 according to the invention for two or four line constructions.

That is, FIG. 27 shows line retaining tracks, 94, those designated as 94A single line dual outlet, those as 94B dual line 4 outlets. Elements 95 are line retaining tools (to hold line 13 in place during assembly). Using this construction an asymmetrical M section of dual line track is provided assuring proper assembly to achieve proper line orientation i.e. the blunt side of the tear drop into the cutting direction.

Figure 30:
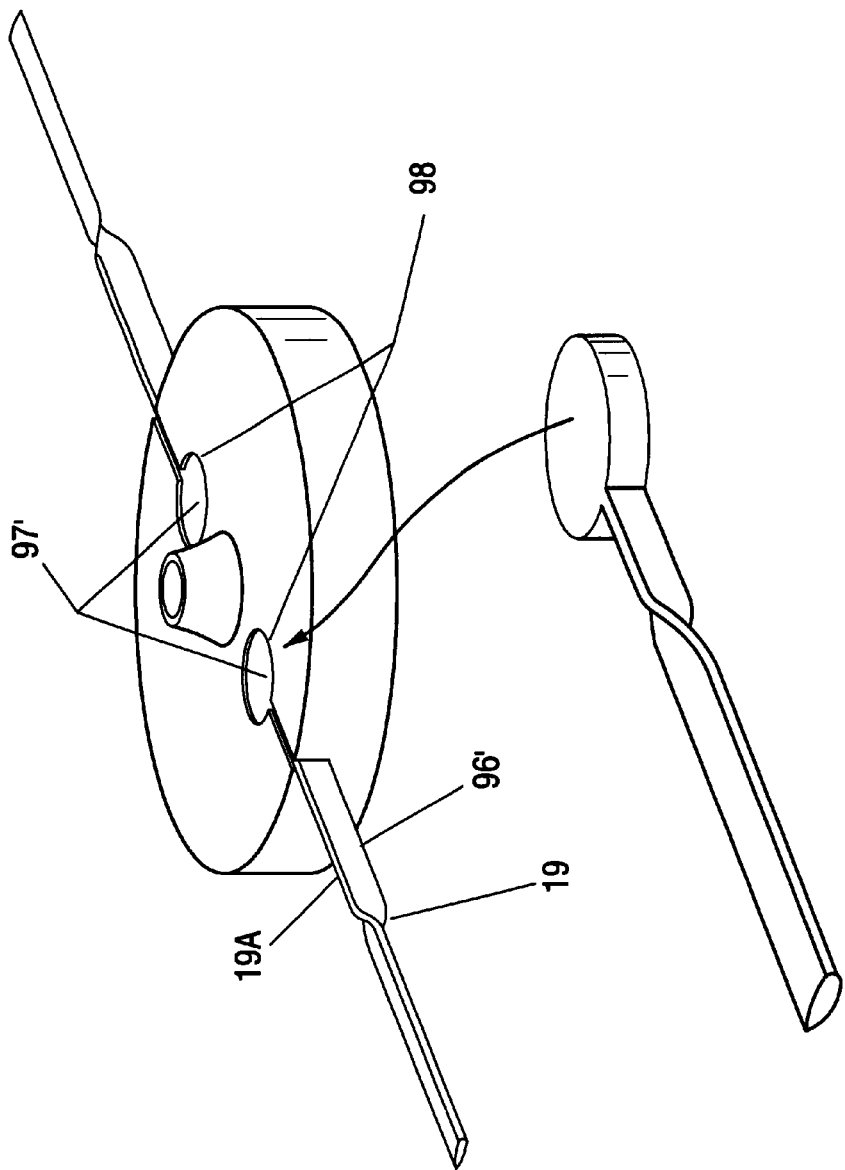
FIGS. 30 and 31 are top schematic perspective views of two alternative embodiments similar to that of FIG. 29.
Figure 31:
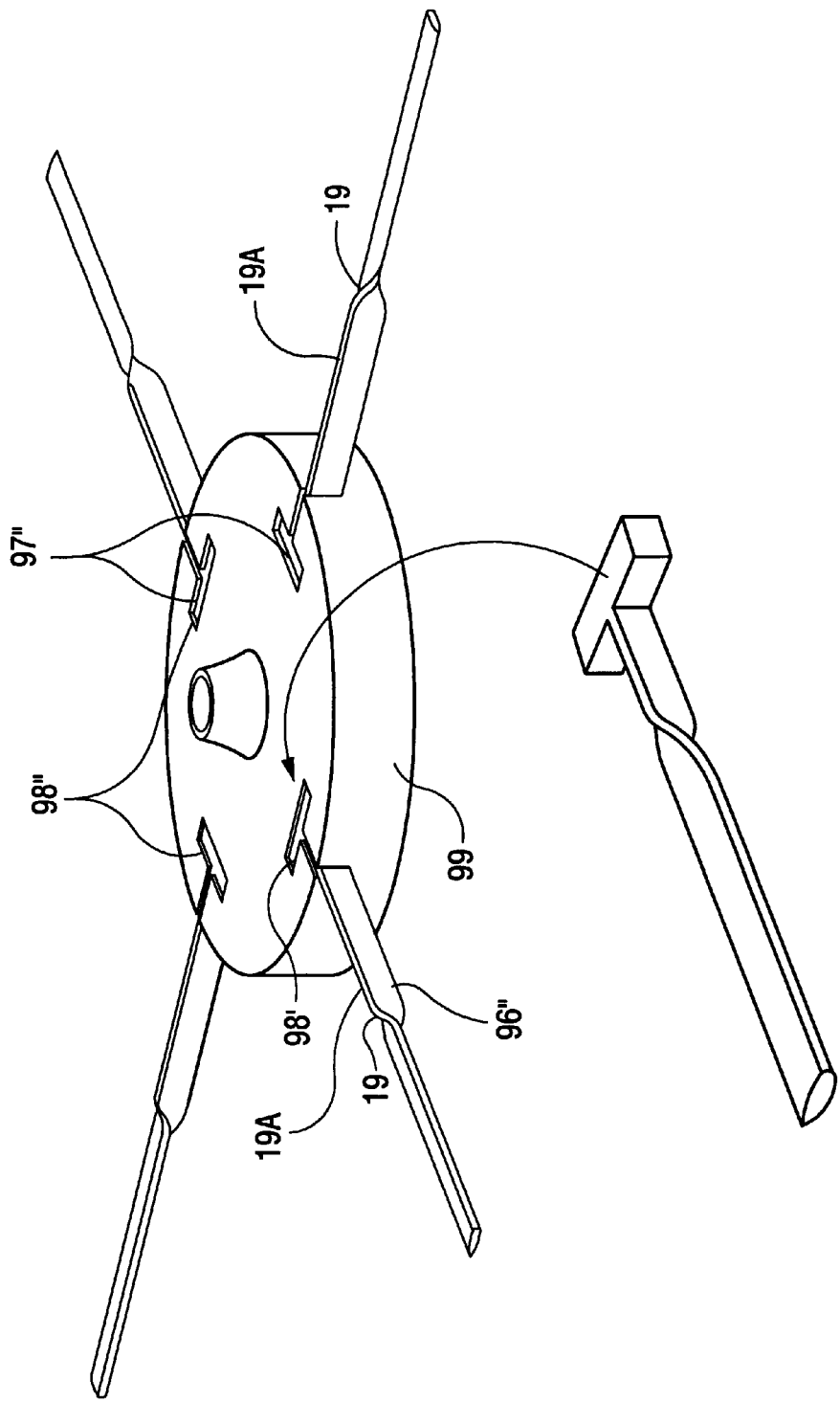

FIG. 28 illustrates a single cutting string section 96 with living hinge 19A which has a keyed mounting element 97 on the opposite side of the twist 19 from the cutting portion 79. The keyed mounting portion 97, which has an enlarged configuration compared to the rest of the cutting string 96, is designed to mount in correspondingly shaped openings 98 formed in a cutting head 99. FIGS. 30 and 31 show similar constructions except that in FIG. 30 the keyed mounting portion 97' of string 96 ' is cylindrical, and in FIG. 31 the keyed mounting portion 97" of string 96 ' is T-shaped, with the corresponding openings 98' and 98", respectively, in the head 99 being the same.

FIGS. 32 and 33 show a configuration similar to that in FIG. 28 except that the cutting string segment 100 is a dual segment with a central keyed mounting portion 101—shown as a rectangle in FIGS. 32 and 33—which mounts in a cooperating mounting opening 102 in a head 103.

FIG. 34 illustrates yet another embodiment of a head 104 for mounting cutting strings 13 according to the invention with the hinge sections 78 prior to the twist 19 exteriorly of the head 104. In this embodiment the eyelets 105 are very large to allow threading therethrough, and the hooks and surface manifestations 106, 107 properly position the strings 13 in place.

FIG. 35 illustrates a construction in which the head 110 merely has enlarged contoured portions 111 which receive a cartridge of similar exterior shape 112 therein. The cartridge 112 mounts the cutting strings 13 in much the same way that heads per se 76, 104 mount the cutting strings 13 in other embodiments. The cap 113 has latching components 114 thereof which cooperate with the latching surfaces 115 of the head 110, and additionally a central threaded shaft or like shaft may be provided for cooperating with the opening 116, the shaft (not shown) associated with the rotatable knob 117 on the cap 113.

The FIG. 35 construction can accommodate a preloaded cartridge 112, which can be mounted upside down into contours 111 placed in the cap 113 instead of the head 110. Such a reversible cartridge 112 could be used as follows: Counterclockwise rotation; use 111 in head 110; clockwise rotation—use the same cartridge 112 with the same cartridge upside down into grooves (111) molded into the cap 113. This maintains proper orientation of a tear drop line direction into the cut, while using the same cartridge configuration which reduces the number of line configurations that are necessary to market—thus minimizing inventories and causing less confusion to the public.

FIGS. 36 and 37 illustrate another manner of mounting the cutting string 13 according to the present invention by using tightly radiussed/asymmetrical looped portions 120 which engage similarly shaped projections in a head 121. In one embodiment according to the invention the length $L_4$ may be 3.70 inches while the length $L_2$ is 4.3 inches, and the twists 19 are about 90°. FIGS. 38 and 39 show the cross sections of the cutting string 13 at the cross sections 38—38 and 39—39, respectively, of FIG. 36. Also, the length $L_1$ from the exterior circumference of the head 121 to the center of the twist 19 can vary from 0 to $L_x$ where $L_x/L$ is greater than or equal to 0. $L=L_1+L_2$. The preferred ratio of $L_1$ to $L_2$ will vary depending on the use application. To reduce high speed resonance when trimming, a ratio of about 0.36 has been found to be best. To reduce low-speed flapping when trimming, the ratio found to be best is about 0.15. Further, for both high and low speed combined, a cross-sectional position (39—39) of about 5° off the horizontal or about 85° off the vertical being formed and held at the twist 19, is best.

When the line 13 is prepared for edging and blowing, the cross-sectional position (39—39) is best set about 45° off the horizontal while the ratio L1/L2 is close to zero for the blower and approximately 0.05 for edging. A combined edger/blower line 13 is best set at 45° pitch (39—39) with an L1/L2 ratio greater than zero and less than 0.05.

When "manicuring" with swath diameters greater than 20", a (39—39) cross-sectional position of about 5° off the horizontal combined with an L1/L2 ratio greater than one and less than 4.625, preferably about 2.205, has been found best.

The length (L3) of twist 19 also has been found best when less than 0.25" for 6 mm line, and will vary depending on the line size (e.g. less than ½" (e.g. between 0.25–0.5 inches) for 4 mm line and less than ½" for 7 mm line).

Figure 40:
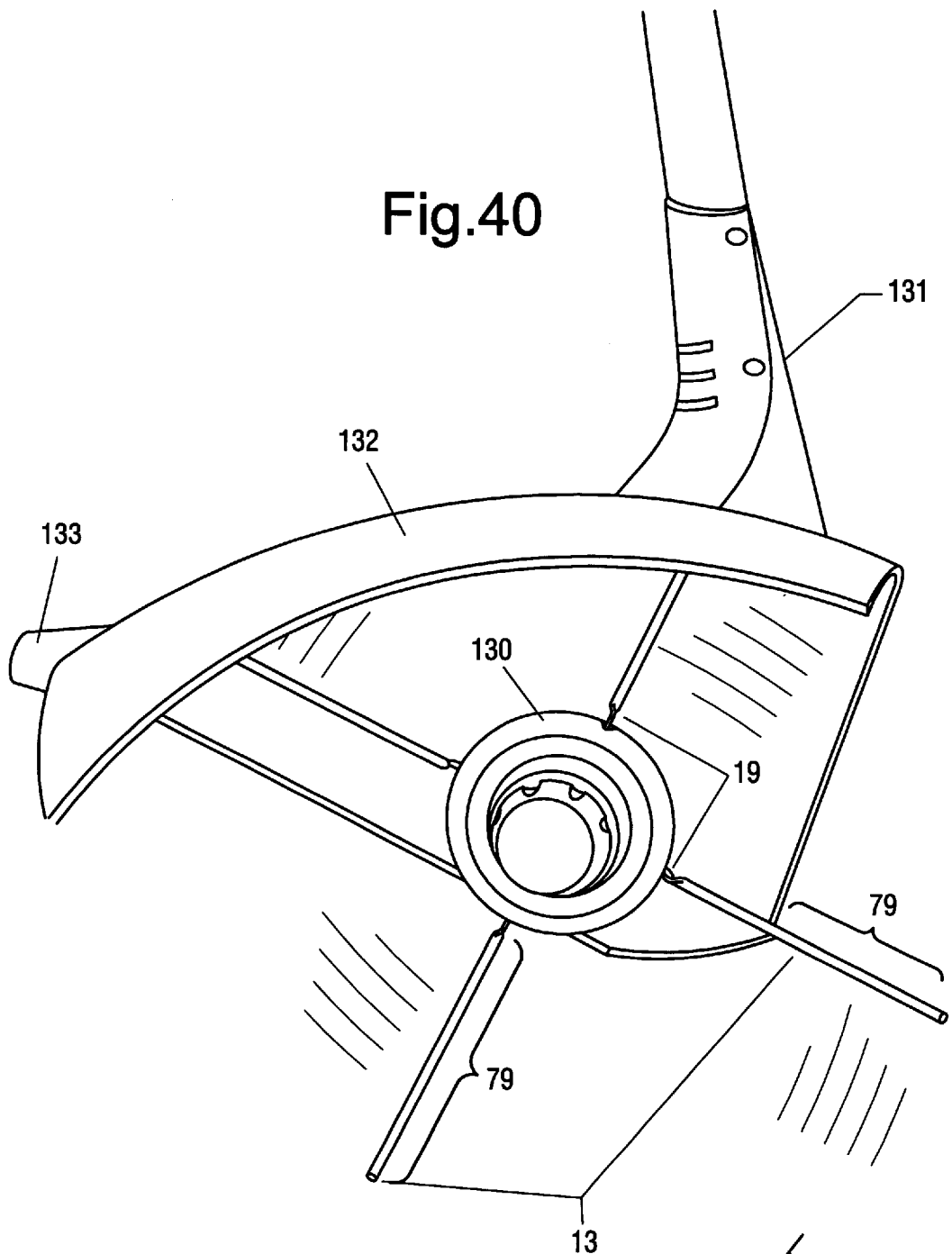
FIG. 40 is a bottom perspective schematic view of a vegetation cutter according to the invention with the control vane tilted so as to perform a blower or sweeper function.

FIG. 40 shows cutting lines 13 according to the present invention mounted in the head 130 in a vegetation cutter 131 having a debris shield/guard 132 with an edging guide 133 so that the cutting sections 79 are oriented so as to provide a blower or sweeper function, e.g. a line blower that is more efficient and quieter than the conventional centrifugal landscape blower. Also the guard 132 helps direct the air flow.

Figure 41:
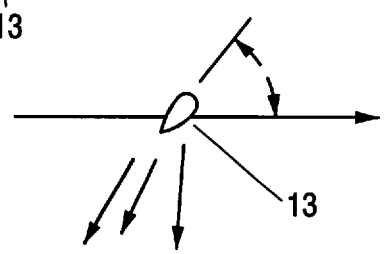
FIG. 41 is a schematic view showing the pitch of the line 13 of FIG. 41 when used for blowing or sweeping.

In the FIG. 40 embodiment, the pitch of the cutting lines 13 according to the present invention are illustrated in FIG. 41. That is, the aerodynamic extruded line 13 would be twisted during manufacture, as seen in FIGS. 40 and 41, at an angle such that it forces air downwardly and outwardly along the ground level. By forcing or displacing the air down not only is the sweeping or blowing action accomplished at the ground level but a cool air current would flow back toward the operator. Even though primarily used for blowing, because the elements are still capable of cutting (although not as effectively as when they have the substantially 0° pitch illustrated in FIG. 2), the cutters can still be used especially for edging, such as cutting grass adjacent to sidewalks, driveways, etc., or cutting vegetation where it is not necessary that the cut be particularly even, such as in cracks, driveways, walkways, etc.

According to the invention a pitch of about 0–5° is optimum for performance and abrasion resistance. For use as a fan, an upward tilt (upward pitch) of over 10° up to about 45° (as in FIG. 41) is optimum. When minimizing or reducing thrown objects is an important consideration while performance, abrasion resistance and resonance reduction are still important, then a balanced optimum pitch is upward about 3–10°.

Figure 42:
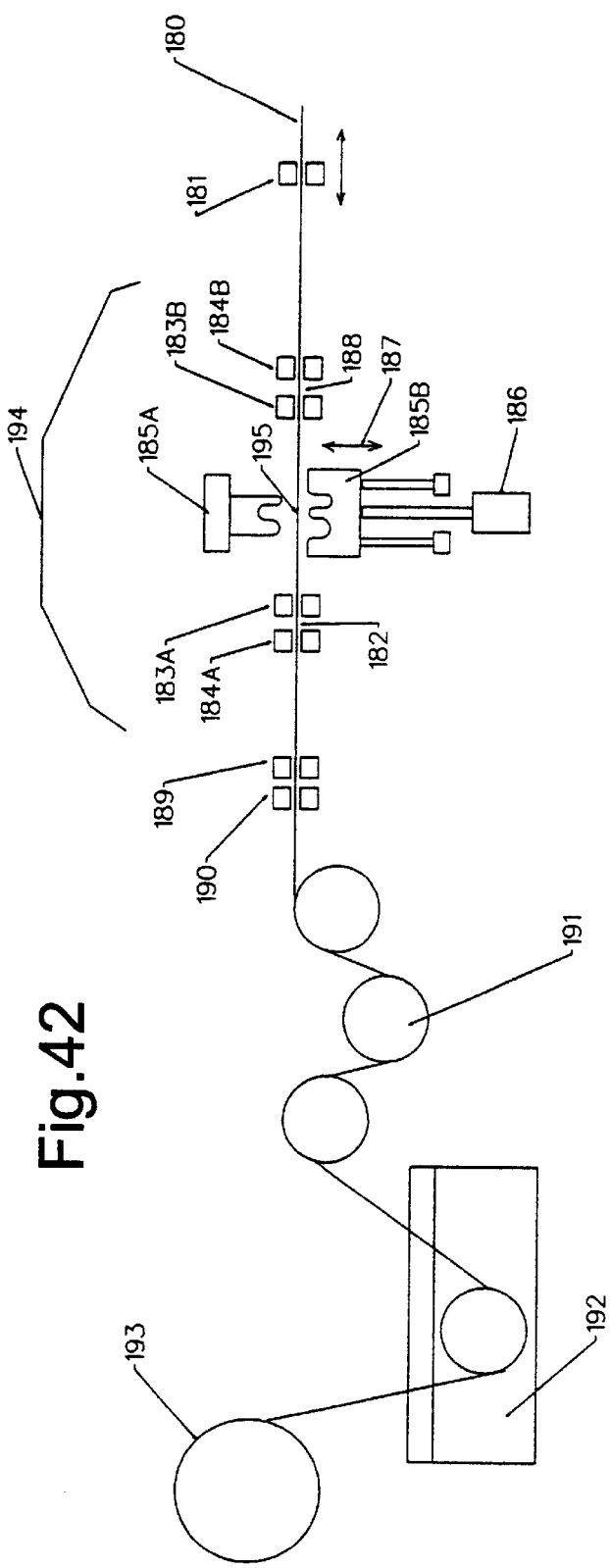
FIG. 42 is a schematic illustration of exemplary apparatus for practicing the method of producing a cutting line with desired twist, living hinge, and control mounting configurations according to the present invention.

Another manufacturing process for producing aerodynamic line 180 is shown in FIG. 42. In the FIG. 42 process aerodynamic line 180, according to the invention, is shuttled or pulled by a shuttling mechanism 181 or pull-roll mechanism (not shown). The line 180 uncoils from coil 193 through a pre-heat source such as a hot water bath 192 or hot oven (not shown) and through a straightening roll-set 191 or other suitable conventional equipment and, when straight, is fed into the forming mechanism 194. The line 180 is then cut into a single length by using a conventional clamp 189 and conventional knife blade cutter 190. Before the line 180 is formed, it is heated to the softening temperature completely along its length in a continuous oven (not shown) or at specific points 182 and 188 with hot air, hot liquid, or by electric resistance elements either separately, consecutively or simultaneously in between clamp mechanisms 183A and 183B and twist mechanisms 184A and 184B and 195 in between the forming platen 185A and 185B.

Once the line 180 reaches forming temperature and the clamps 183A and 183B are pressed onto line 180 the twist mechanism clamps or grasps the line 180 and twists or rotates the line as heat is applied. The line 180 may require over-twisting to exceed the residual stresses and/or to allow the line to relax back to the proper twist angle (e.g. 90°) upon cooling. The clamp mechanism 183 and twist mechanism must remain in the twisted position until the twist areas 182 and 188 reach about ambient temperature, which can be accomplished by forced cooling with air or water spray jets, or by natural cool-down in ambient conditions. It is possible to form the twists by fixturing twist and clamp mechanisms that apply adequate torque to overcome the torque resistance of the line 180 while heat is applied. These fixtures (not shown) will twist the line when it reaches its softness temperature and can remain fixed onto the line 180 until it cools to ambient temperature.

The area 195 on line 180 is formed after being heated to forming temperature by moving the lower platen element 185B into engagement with the upper element 185A using a hydraulic cylinder 186 or the like, moving in the direction of the arrow 187, for example. The platens 185A and 185B may be heated by internal electric resistance coils, or instead may comprise cold stamping elements.

Figure 44:
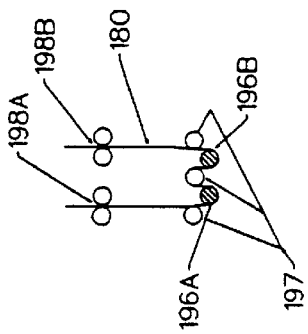
FIGS. 43 and 44 schematically illustrate another manner of introducing a twist into the line produced according to the present invention.
Figure 43:
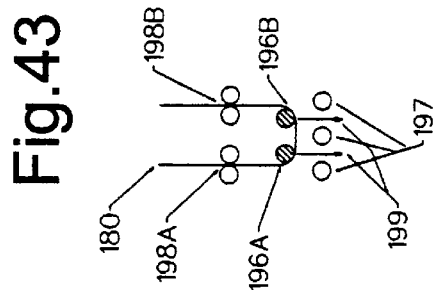

The area 195 of line 180 can alternatively be formed as schematically shown in FIGS. 43 and 44. Line 180 is held by torque resistance rollers 198A and 198B and when the line 180 is heated to the necessary forming temperatures by air, an oven, a liquid, or electrical resistance coils, separately or combined. Movable dowel pins 196A and 196B are utilized by shuttling in the direction 199 through a separate plate (not shown) to that plate holding dowel pins 197. In terms of the twisting sequence, section 195 can be formed first before the twist process occurs making it possible to perform the twists by rotating the twisting mechanisms in the same direction. Alternatively section 195 can be formed after the twisting has been performed as shown in FIG. 42. In this scenario the twists must be performed by opposite direction rotation prior to section 195 forming.

Alternatively, there may be a process of feeding line from the spool with a field operator using a twisting tool to twist the line outside of the head (the line could be wound inside of the head on single or dual spools). The number of winding tracks or spool grooves can be equal to the number of output lines. Still further stamping of the cutting elements from extruded polymer sheets may be provided, or extruding or post forming surface finishes. The twisting may also provide heat for industrial or operator twist forming.

In all of the above discussions it is to be understood that the broad ranges given also encompass all narrower ranges within the scope of the broad ranges. For example, a ratio of between about 1.6–1.9 also encompasses all the ratios therebetween, such as about 1.6–1.7, etc. Conventional equivalents may also be substituted for above discussed equipment and/or process steps.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of cutting vegetation using a powered string trimmer head rotatable about an axis of rotation, and at least one string of primarily non-metallic flexible material having a first long axis and a second short axis, with the second axis less than 85% of the first axis, the string having a free end and a single substantially permanent turn remote from the free end and remote from the head and adjacent a living hinge, the free end having a curved edge; said method comprising the steps of:

(a) mounting the string in the string trimmer head at a first portion of the string so that the string extends radially outwardly from the head with the free end and the single turn both remote from the head, and a portion of the string on the opposite side of the free end from the single turn operatively engaging the head, while orienting the string so that the first axis is substantially perpendicular to the axis of rotation; and (b) powering the head about the axis of rotation so that the first axis is substantially maintained in a cutting plane substantially perpendicular to the axis of rotation, the single turn providing pitch control and the living hinge allowing deflection of the string when impacting an object substantially incapable of being cut.

2. A method as recited in claim 1, wherein the string comprises a mounting end of a predetermined shape, and wherein step (a) is practiced by fitting the mounting end of the string in a complementary-shaped channel in the string trimmer head.

3. A method as recited in claim 1 wherein the string comprises a first line with first single turn remote from a first portion of the head and adjacent a first living hinge and a second line with a second single turn remote from a second portion of the head and adjacent a second living hinge, with a portion of the string between the first and second single turns; and wherein step (a) is practiced to mount the portion of the string between the first and second single turns to the head.

4. A method as recited in claim 3 wherein the head is configured and step (a) is practiced so that free ends of the first and second lines are about 90 degrees apart during the practice of step (b).

5. A method as recited in claim 3 wherein the head is configured and step (a) is practiced so that free ends of the first and second lines are about 180 degrees apart during the practice of step (b).

6. A method as recited in claim 3 wherein step (a) is practiced by clamping the string to the head.

7. A method as recited in claim 1 wherein the head includes a groove or slot having a receiving dimension about at least as large as said second axis but not as large as said first axis; and wherein step (a) is practiced so that the second axis of the string portion opposite the single turn from the free end is received by the groove or slot to substantially maintain the orientation of the first axis and its curved leading edge directed into the vegetation to be cut.

8. A method as recited in claim 7 wherein the groove or slot is non-linear, and step (a) is practiced by mounting the string so that it extends in the non-linear groove or slot.

9. A method as recited in claim 1 wherein step (b) is practiced by powering the head at a speed of about 2500–7500 rpm.

10. A method as recited in claim 9 wherein steps (a) and (b) are further practiced so that the swath width during cutting is between about 15–17 inches.

11. A method as recited in claim 1 wherein (b) is further practiced so that the string has a drag coefficient of less than 1.0 at 8000 rpm for a 17 inch swath.

12. A method as recited in claim 1 wherein (b) is further practiced so that the string has a drag coefficient of less than 0.8 at 8000 rpm for a 17 inch swath.

13. A vegetation cutter comprising:

a head, handle, and motor;

a substantially non-metallic cutting string having a first free end, the capability of a drag coefficient of less than 0.8, a living hinge, a single turn, and a mounting portion opposite said free end from said single turn; and said cutting string mounting portion mounting said cutting string to said head so that said first free end and said single turn are remote from said head and said cutting string is configured with an aerodynamically shaped cross-section such that said cutting string has a drag coefficient of less than 0.8 when rotated by said head at 8000 rpm for a 17 inch swath, and when having a dimension of 0.08 inches substantially perpendicular to the direction of movement of the string.

14. A vegetation cutter as recited in claim 13 wherein said cutting string is in a cartridge; and wherein said head mounts said cartridge so that it is reversible.

15. A string mounted in a vegetation cutter head as recited in claim 13 wherein the spacing of said center of said head to said single turn is $L_1$ and the spacing of said center of said single turn to said free end is $L_2$, and wherein $L_1/L_2$ is between 0.15 and 4.625.

* * * * *